US012472650B1

(12) United States Patent
Yang

(10) Patent No.: US 12,472,650 B1
(45) Date of Patent: Nov. 18, 2025

(54) SCRAPER

(71) Applicant: Maya Technologies Limited, Hong Kong (CN)

(72) Inventor: Shanglin Yang, Hong Kong (CN)

(73) Assignee: Maya Technologies Limited, Hong Kong (CN)

( * ) Notice: Subject to any disclaimer, the term of this patent is extended or adjusted under 35 U.S.C. 154(b) by 0 days.

(21) Appl. No.: 19/190,853

(22) Filed: Apr. 28, 2025

Related U.S. Application Data

(63) Continuation-in-part of application No. 29/989,717, filed on Feb. 14, 2025, and a continuation-in-part of application No. 29/989,709, filed on Feb. 14, 2025.

(30) Foreign Application Priority Data

Apr. 1, 2025 (CN) ......................... 202520601410.5

(51) Int. Cl.
*B26B 5/00* (2006.01)
*A47L 13/08* (2006.01)

(52) U.S. Cl.
CPC .............. *B26B 5/003* (2013.01); *A47L 13/08* (2013.01)

(58) Field of Classification Search
None
See application file for complete search history.

(56) References Cited

U.S. PATENT DOCUMENTS 4,558,517 A * 12/1985 Gringer .................. B44D 3/164 30/162
4,955,138 A * 9/1990 Henke ..................... A47L 13/08 30/169
5,433,004 A * 7/1995 Thompson ............. A47L 13/08 30/169
5,528,832 A * 6/1996 Schmidt .................. A47L 13/08 30/169
2011/0094109 A1* 4/2011 Chiu ....................... B26B 5/001 30/162
2014/0290070 A1* 10/2014 Landwehr ............... A47L 13/08 30/169

* cited by examiner

*Primary Examiner* — Hwei-Siu C Payer

(57) ABSTRACT

A scraper includes: a blade; a housing; and a connection member. The housing defines a storage cavity and has a first limiting portion. The connection member is slidably mounted in the storage cavity and includes an external portion in which the blade is mounted and a second limiting portion mated. When the connection member is slid from a first position to a second position, the second limiting portion is mated with the first limiting portion to prevent sliding of the connection member, the blade partially protrudes out of the storage cavity. When a force perpendicular to a sliding direction of the connection member is applied to the second limiting portion or the first limiting portion, the second limiting portion is disengaged from the first limiting portion to release the connection member; when the connection member is slid to a third position, the blade is in a replaceable state.

6 Claims, 42 Drawing Sheets

SCRAPER

CROSS REFERENCE TO RELATED APPLICATIONS

The present application is a continuation-in-part application of: the US design application Ser. No. 29/989,717, filed on Feb. 14, 2025, and the US design application Ser. No. 29/989,709, filed on Feb. 14, 2025; and claims the priority of the Chinese patent application No. 202520601410.5, filed on Apr. 1, 2025; and contents of which are incorporated herein by their entireties.

TECHNICAL FIELD

Embodiments of the present disclosure relate to the technical field of knives, and more specifically, to a scraper.

BACKGROUND

A scraper is a tool configured to clear wall stickers, automobile glass film, adhesive on flat surfaces, and so on. A blade of the scraper is controlled by a button, and the button can be slid to different positions to make the blade stay in the following different states: a storage state in which the blade is received in the housing, an operating state in which the blade is partially exposed to an outside of the housing, and a replaceable state in which the blade is completely exposed to the outside of the housing. In the art, the scraper is not arranged with any limiting mechanism, and therefore, when the user sets the blade to the operating state, the blade can be easily mistakenly pushed to the replaceable state, such that the blade may fall off, affecting the user experience.

SUMMARY

The present disclosure provides a scraper, including: a blade; a housing; and a connection member. The housing defines a storage cavity therein. The storage cavity has an opening, and the housing is further arranged with a first limiting portion. The connection member is slidably mounted in the storage cavity and comprising an external portion in which the blade is mounted and a second limiting portion mated with the first limiting portion. When the connection member is slid from a first position to a second position, the second limiting portion is mated with the first limiting portion to prevent the connection member from continuing sliding towards the opening, the blade partially protrudes out of the storage cavity through the opening, and the scraper is in an operating state. When a force perpendicular to a sliding direction of the connection member is applied to at least one of the second limiting portion and the first limiting portion, the second limiting portion is disengaged from the first limiting portion to release the connection member; when the connection member is slid to a third position, the blade is in a replaceable state.

BRIEF DESCRIPTION OF THE DRAWINGS

In order to more clearly illustrate technical solutions in embodiments of the present disclosure, accompanying drawings used in the embodiments will be briefly introduced below. Obviously, the accompanying drawings in the following description show only some of the embodiments of the present disclosure, and any ordinary skilled person in the art may obtain other accompanying drawings based on these drawings without creative work.

REFERENCE NUMERALS

Figure 1:
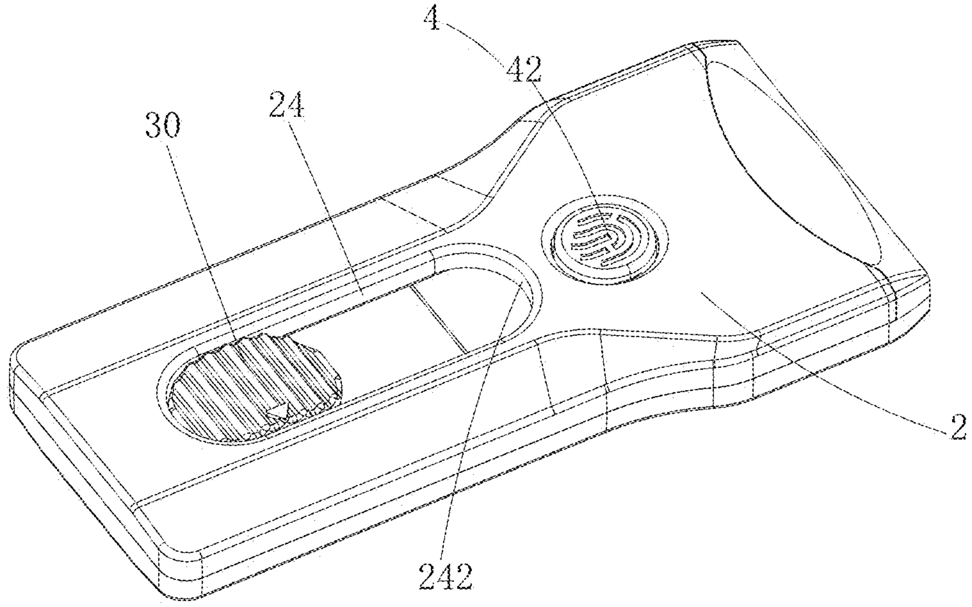
FIG. 1 is a structural schematic view I of the entire scraper according to an embodiment I of the present disclosure, where a blade is in a storage state.
Figure 2:
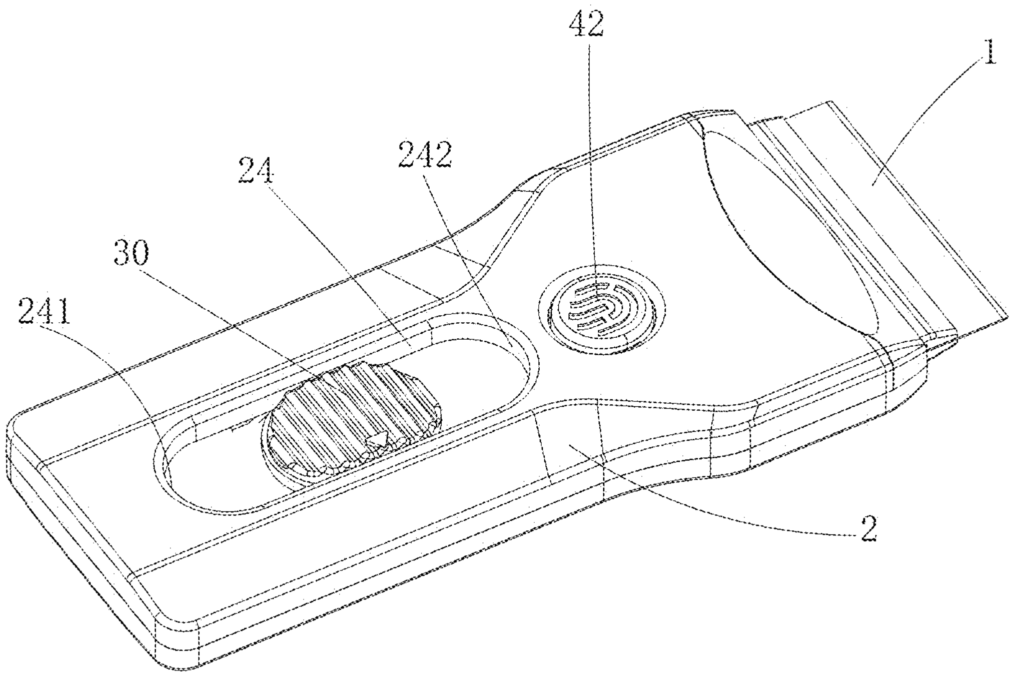
FIG. 2 is a structural schematic view II of the entire scraper according to the embodiment I of the present disclosure, where the blade is in an operating state.

1—blade;

2—housing; 20—storage cavity; 200—opening; 201—avoidance space; 21—upper housing; 22—lower housing; 23—first limiting portion; 231—limiting wall; 232—limiting snap hole; 233—limiting rod; 2330—limiting block; 2331—curved contact surface; 234—resilient reset member; 2340—U-shaped resilient rod; 24—guiding hole; 240—initial snap hole; 241—first end portion; 242—second end portion; 25—curved guiding groove; 26—slide groove; 27—U-shaped groove; 28—first limiting snap slot;

3—connection member; 30—operating button; 300—limiting protrusion; 31—body portion; 310—mounting hole; 32—external portion; 320—fixation plate; 3200—snap protrusion; 321—movable plate; 3210—snap hole; 33—second limiting portion; 330—fixation end; 3300—outer surface; 331—limiting end; 3310—vertical plate; β—first angle; 332—limiting button; 3320—limiting tab; 3321—guiding post; 334—second limiting snap slot; 34—resilient portion; 340—resilient support; 341—connection end; 342—movable end; 343—resilient space;

4—Auxiliary button; 40—avoidance surface; 41—resilient pressing sheet; 42—movable button; 420—connection block;

5—control member; 500—knob; 510—transmission block; D1—maximum diameter; D2—minimum diameter; 52—guiding protrusion.

DETAILED DESCRIPTIONS

Unless otherwise defined, all technical and scientific terms used herein have the same meaning as commonly understood by any ordinary skilled person in the art. The terms used herein in the specification of the present disclosure are used only for the purpose of describing specific embodiments and are not intended to limit the present disclosure. Terms "include", "have", and any variations thereof in the specification, claims and the accompanying drawings of the present disclosure are intended to cover non-exclusive inclusion. Terms "first", "second", and so on in the specification, claims, and the drawings of the present disclosure are used to distinguish between different objects and are not intended to describe a particular order.

Reference to "embodiments" herein implies that particular features, structures or characteristics described in an embodiment may be included in at least one embodiment of the present disclosure. Presence of the phrase at various sections in the specification does not necessarily refer to one same embodiment nor a separate or alternative embodiment that is mutually exclusive of other embodiments. Any ordinary skilled person in the art shall understand, both explicitly and implicitly, that the embodiments described herein may be combined with other embodiments.

In order to enable any ordinary skilled person in the art to better understand the embodiments of the present disclosure, technical solutions in the embodiments of the present disclosure will be clearly and completely described below by referring to the accompanying drawings.

As shown in FIGS. 1-42, the present disclosure provides a scraper, including a blade 1, a housing 2, and a connection member 3. The housing 2 defines a storage cavity 20 therein, and the storage cavity 20 has an opening 200. Specifically, the housing 2 is formed by an upper housing 21 and a lower housing 22 that are engaged with each other. The upper housing 21 and the lower housing 22 enclose to form the storage cavity 20. The housing 2 is bar-shaped and flat in overall, and the storage cavity 20 is correspondingly narrow and flat. The bar-shaped and flat housing 2 can be held and operated by a user conveniently. The opening 200 is defined at a front end of the housing 2 communicating the storage cavity 20 with an outside of the housing. The blade 1 may enter or exit the storage cavity 20 through the opening 200. The housing 2 is further arranged with a first limiting portion 23. The connection member 3 can be slidably mounted inside the storage cavity 20 and can be moved along a length direction of the storage cavity 20. The connection member 3 includes an external portion 32 for mounting the blade 1 and a second limiting portion 33 snapped with a first limiting portion 23.

Figure 5:
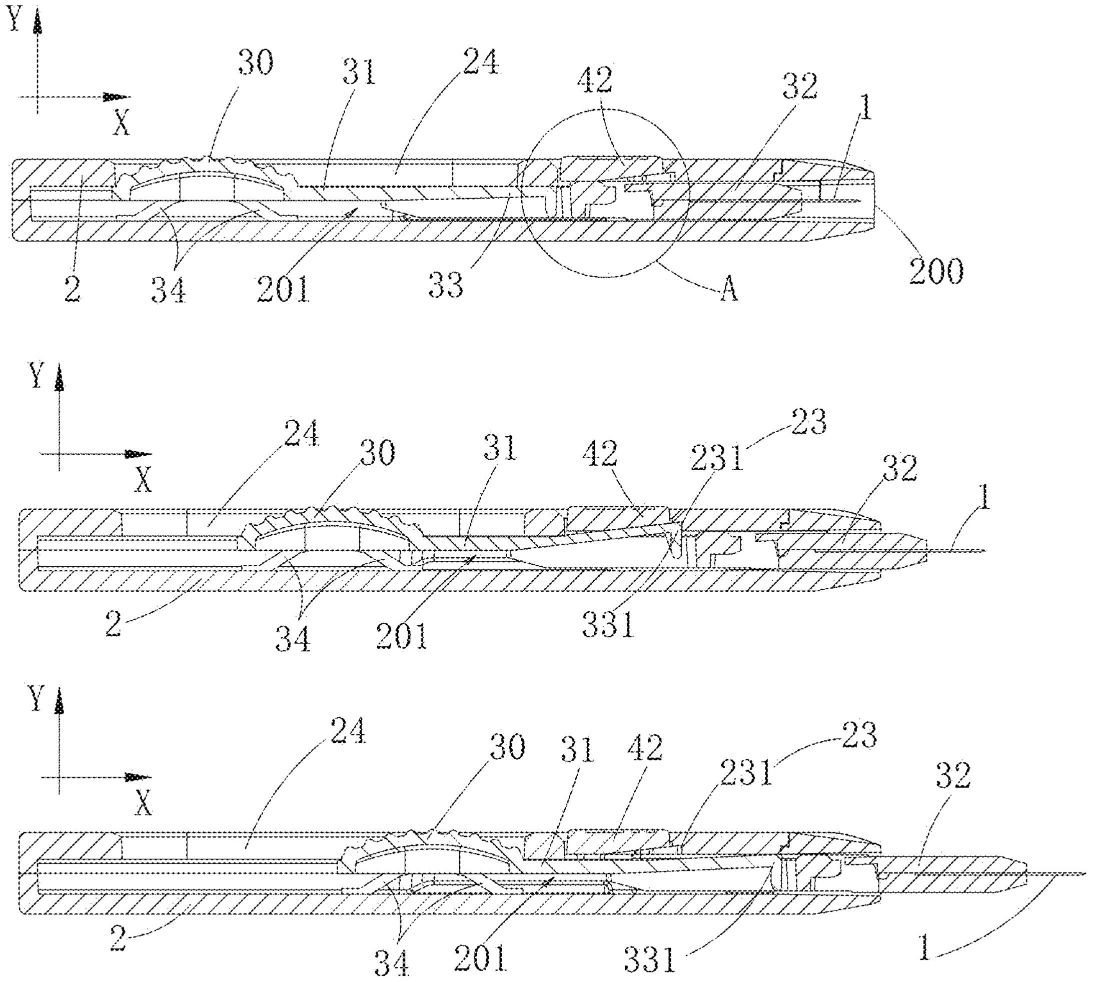
FIG. 5 is a cross-sectional view of the scraper according to the embodiment I of the present disclosure.

To be noted that the connection member 3 has a first position, a second position and a third position. When the connection member 3 is at the first position, the blade 1 is completely received in the storage cavity 20, and the scraper is in a storage state, such that the user may carry and store the scraper conveniently. When the connection member 3 is slid from the first position to the second position, the second limiting portion 33 is mated with the first limiting portion 23 to prevent the connection member 3 from continuing sliding towards the opening 200 (sliding in an X-axis direction as shown in FIG. 5). At this moment, the blade 1 partially extends out of the storage cavity 20 through the opening 200, and the scraper is in an operating state. The user may grip the housing 2 to control the blade 1 to scrape and remove objects from a tabletop and glass. A force perpendicular to a sliding direction of the second limiting portion 33 is applied to at least one of the second limiting portion 33 and the first limiting portion 23 to disengage the second limiting portion 33 from the first limiting portion 23, such that the connection member 3 is released, and the connection member 3 may continue to slide towards the opening 200 to reach the third position to enable the blade 1 to completely extend out of the storage cavity 20. In this way, the blade 1 is in the replaceable state, and the user may replace the blade. Therefore, in the present embodiment, after the second limiting portion 33 is mated with the first limiting portion 23, the force perpendicular to the sliding direction of the connection member 3 needs to be applied to the second limiting portion 33 or the first limiting portion 23. Therefore, at the time when the user is using one hand to control sliding of the connection member 3 and after the first limiting portion 23 is mated with the second limiting portion 33 to limit sliding of the connection member 3, the user needs to use the other hand to apply a force to the second limiting portion 33 or the first limiting portion 23 to release the mating between the first limiting portion 23 and the second limiting portion 33 enable the connection member 3 continue sliding. In this way, when the user uses the scraper with one hand, the blade 1 is prevented from being unable to be maintained in the working state and from being pushed from the storage state directly to the replaceable state. Misoperation of the scraper when the scraper is being in use may be avoided, the blade 1 is prevented from falling out of the scraper, and the user experience of is improved.

Figure 8:
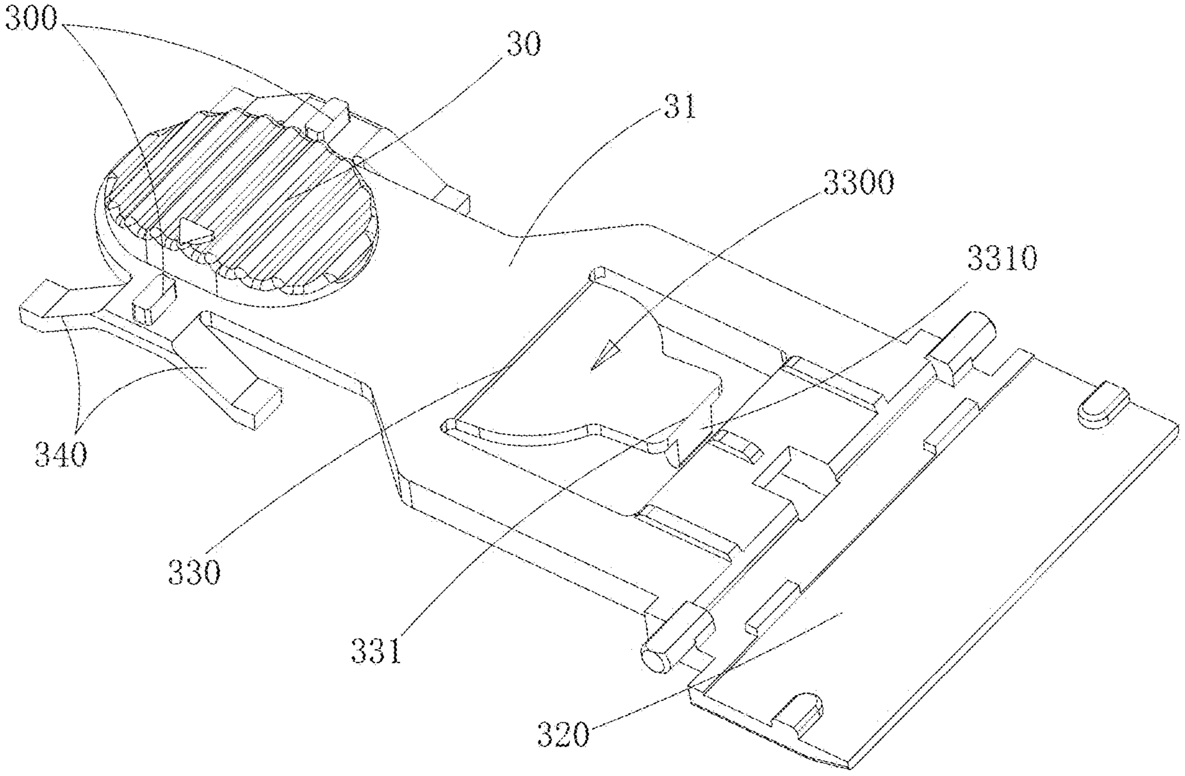
FIG. 8 is a structural schematic view of a connection member according to the embodiment I of the present disclosure, where the blade is in an operating state.
Figure 9:
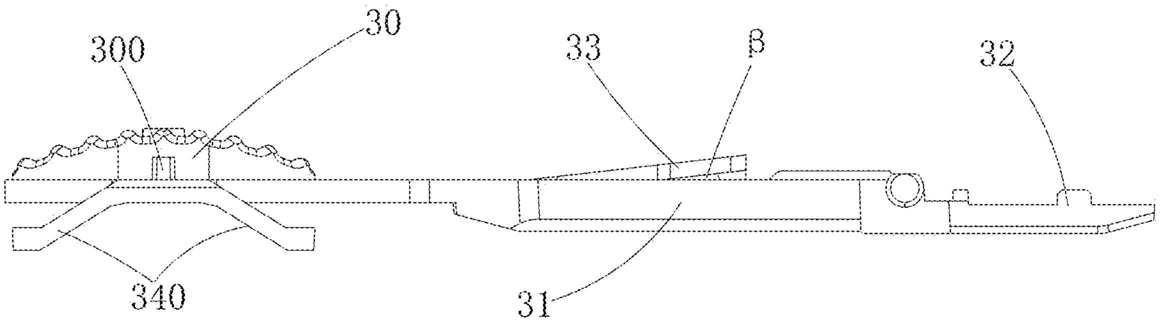
FIG. 9 is a side plane view of the connection member according to the embodiment I of the present disclosure, where the blade is in an operating state.

In order to improve stability of slidable connection between the connection member 3 and the storage cavity 20, the connection member 3 is configured to be flat as shown in FIGS. 8 and 9. In the present embodiment, the connection member 3 further includes an operation button 30 and a body portion 31, and two ends of the body portion 31 are connected to the operation button 30 and the external portion 32, respectively. That is, the operation button 30 is arranged at an end of the body portion 31 away from the external portion 32. In this way, an operating region of the user is spaced apart from the blade 1, improving safety of using the scraper, and facilitating the user to operate the operation button 30 to drive the connection member 3 to slide, so as to control the blade 1 to enter or exit the storage cavity 20.

In some embodiments, the second limiting portion 33 is resilient, and by applying the force to the second limiting portion 33, the second limiting portion 33 may be disengaged from the first limiting portion 23.

Embodiment I shown in FIGS. 1 to 10:

The second limiting portion 33 includes a fixation end 330 connected to the body portion 31 and a limiting end 331. The limiting end 331 is inclined with respect to the body portion 31 and extends toward the opening 200. When the connection member 3 is slid to the second position, the limiting end 331 abuts against the first limiting portion 23. In the present embodiment, as shown in FIGS. 5-9, the first limiting portion 23 includes a limiting wall 231, and the limiting wall 231 is arranged at an inner side of the housing 2. A first angle β is formed between the second limiting portion 33 and the connection member 3, and the first angle β faces towards the opening 200. When the connection member 3 is at the first position, the limiting end 331 abuts against an inner side wall of the housing 2, and the first angle β faces toward the limiting wall 231. In this way, when the connection member 3 is slid from the first position to the second position, the limiting end 331 abuts against the limiting wall 231, so as to limit the connection member 3 from continuing to slide towards the opening 200, and the scraper is maintained at the operating state. In the above process, the limiting end 331 constantly abuts against the inner side wall of the housing 2, and the first angle β faces toward the limiting wall 231. Therefore, the user does not need to perform any operation other than pushing the connection member 3 to switch the scraper from the storage state to the operating state, and the user may push the connection member 3 reversely to switch the scraper from the operating state to the storage state, such that the user may easily use the scraper. When the blade 1 of the scraper needs to be replaced, the user may use the other hand to press the limiting end 331 to cause the second limiting portion 33 to be deformed in a direction towards the body portion 31, such that the limiting end 331 is disengaged from the limiting wall 231. At this moment, the connecting member 3 may further be pushed towards the opening 200, such that the blade 1 fully extends out of the storage cavity 20 to be replaced. At this position, the limiting end 331 still abuts against the inner side wall of the housing 2, and the first angle β faces away from the limiting wall 231. The limiting end 331 is a flat surface towards the fixation end 330, such that when the connection member 3 slides from the first position to the second position, the limiting end 331 is not affected by the limiting wall 231, and that is, the connection member 3 can slide smoothly during the sliding process from the second position to the first position. Therefore, the user, after replacing the blade 1, can quickly switch to the operating state or the storage state to use the scraper. Therefore, the user can use the scraper more easily, and the user experience is improved.

To be noted that the limiting end 331 may alternatively configured as a vertical plate 3310 as shown in FIG. 8, such that a contact area between the limiting end 331 and the limiting wall 231 is increased, improving stability of the blade 1 when being in the operating state.

As shown in FIG. 9, the first angle β ranges from 5 to 85 degrees. When the first angle β is excessively small, the limiting end 331 may not be able to stably abut against the limiting wall 231. When the first angle β is excessively large, the second limiting portion 33 may occupy a space in a thickness direction of the storage cavity 20, causing the housing 2 to be excessively thick, which is inconvenient for the user to use the scraper. Since the second limiting portion 33 needs to repeatedly abut against the limiting wall 231, the first angle β being excessively large may cause the second limiting portion 33 to be cracked, such that the scraper may not be used for a long term. Therefore, in the present embodiment I, the first angle β may be 6.5 degrees, so as to prevent the housing 2 from being excessively thick, to facilitate the user to use the scraper conveniently, and to improve a service life of the scraper.

Figure 4:
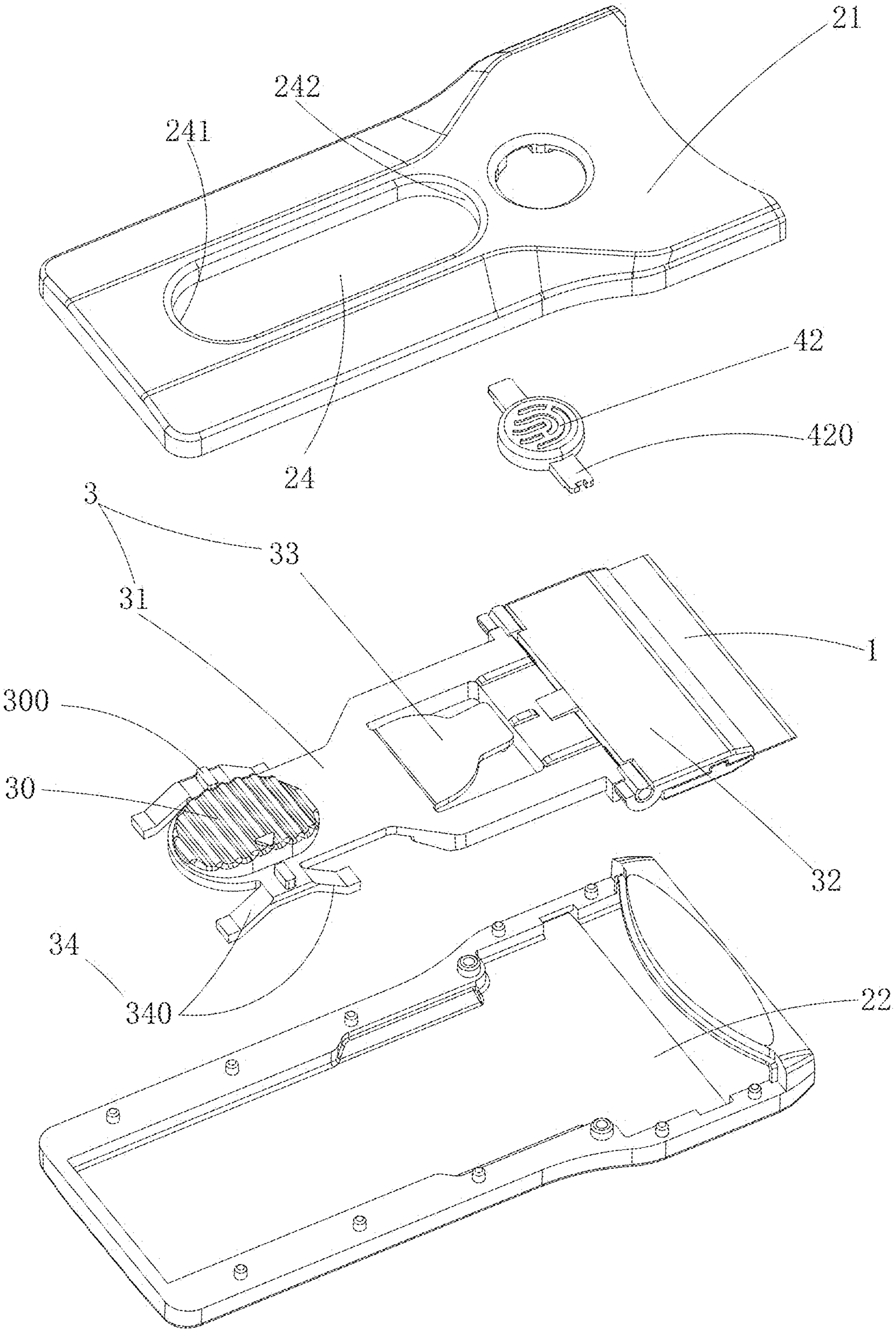
FIG. 4 is an exploded view of the scraper according to the embodiment I of the present disclosure.
Figure 6:
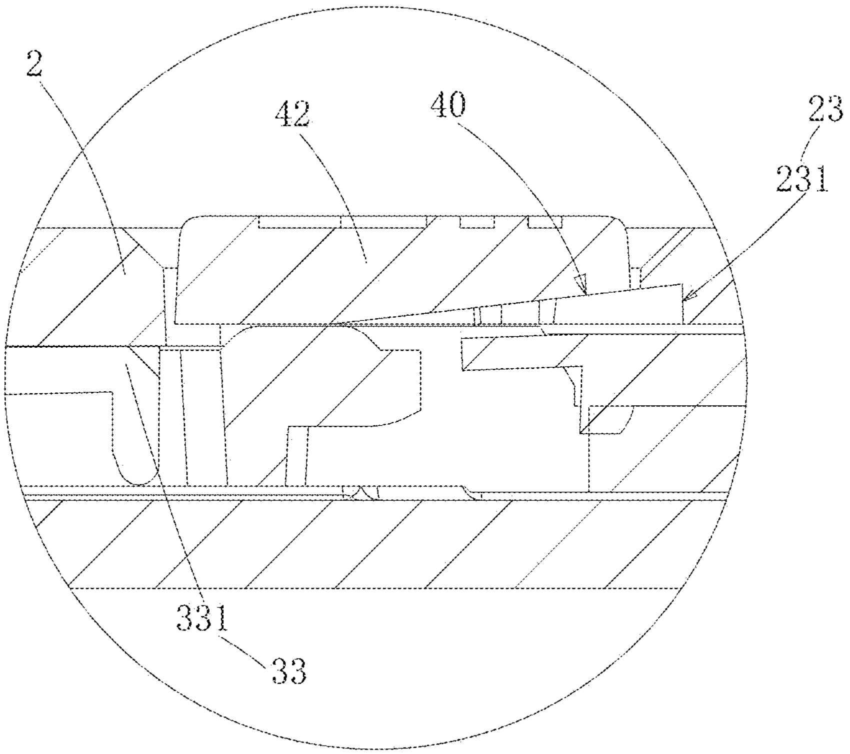
FIG. 6 is an enlarged view of a portion A shown in FIG. 5.
Figure 7:
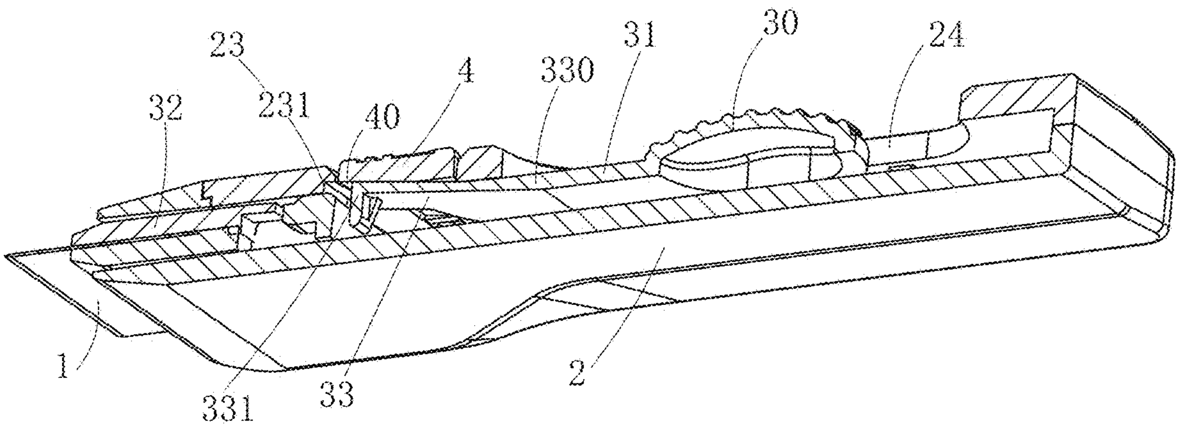
FIG. 7 is a perspective cross-sectional view of the scraper according to the embodiment I of the present disclosure.
Figure 10:
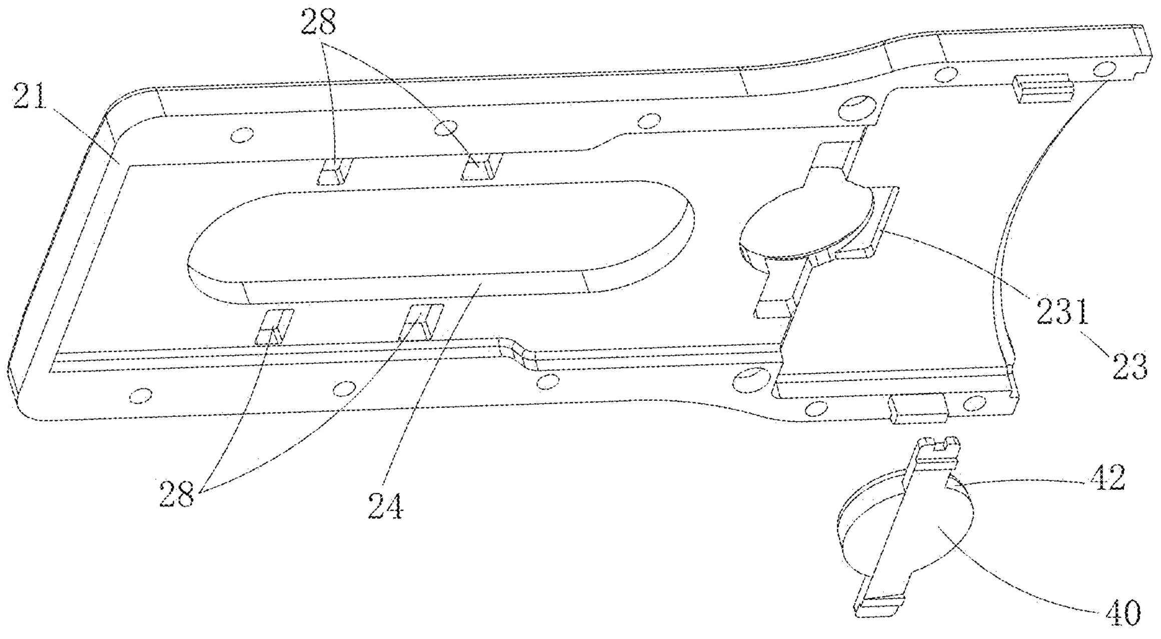
FIG. 10 is an exploded view of a housing and an auxiliary button according to the embodiment I of the present disclosure, where the blade is in an operating state.
Figure 11:
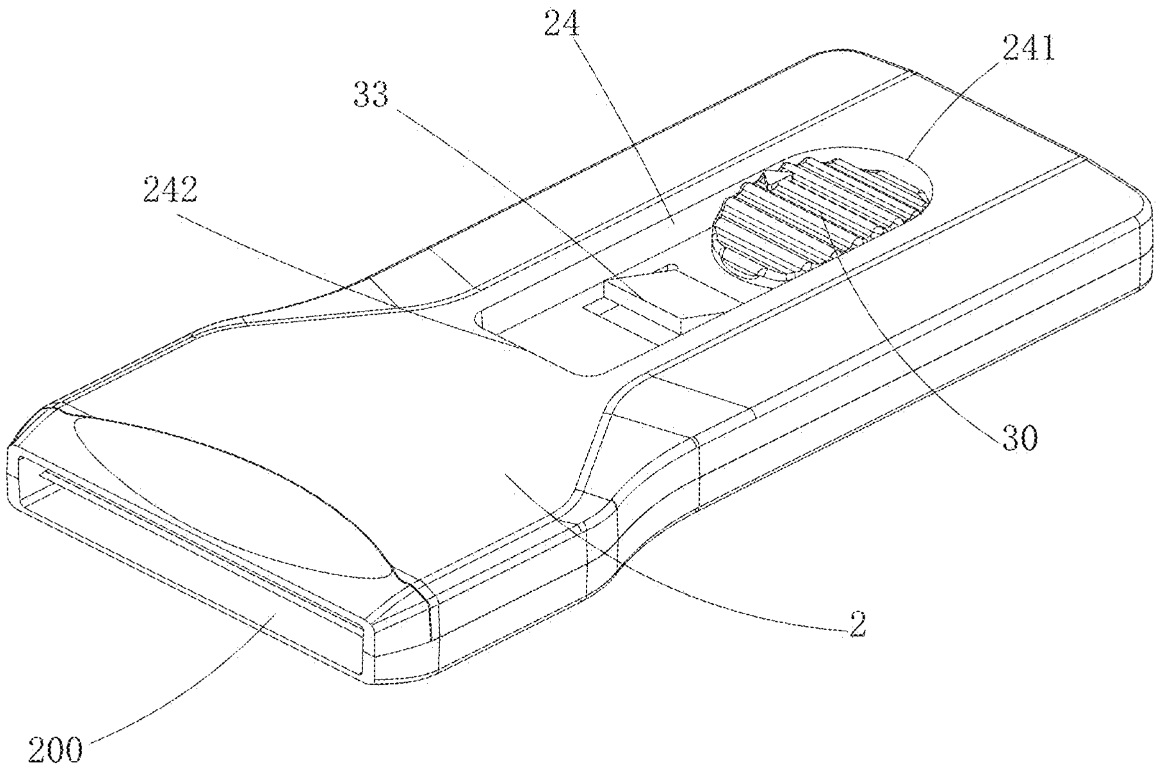
FIG. 11 is a structural schematic view I of the entire scraper according to an embodiment II of the present disclosure, where the blade is in the storage state.
Figure 12:
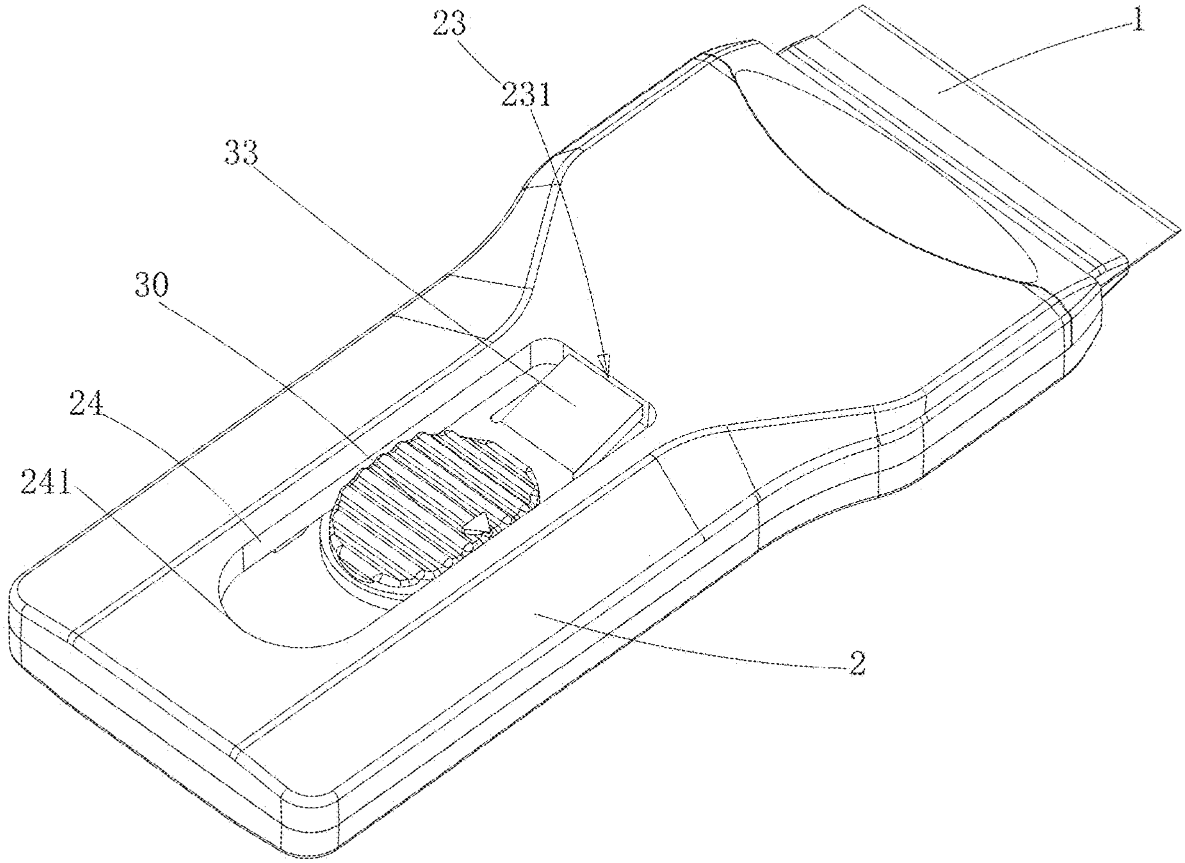
FIG. 12 is a structural schematic view II of the entire scraper according to the embodiment II of the present disclosure, where the blade is in the operating state.
Figure 13:
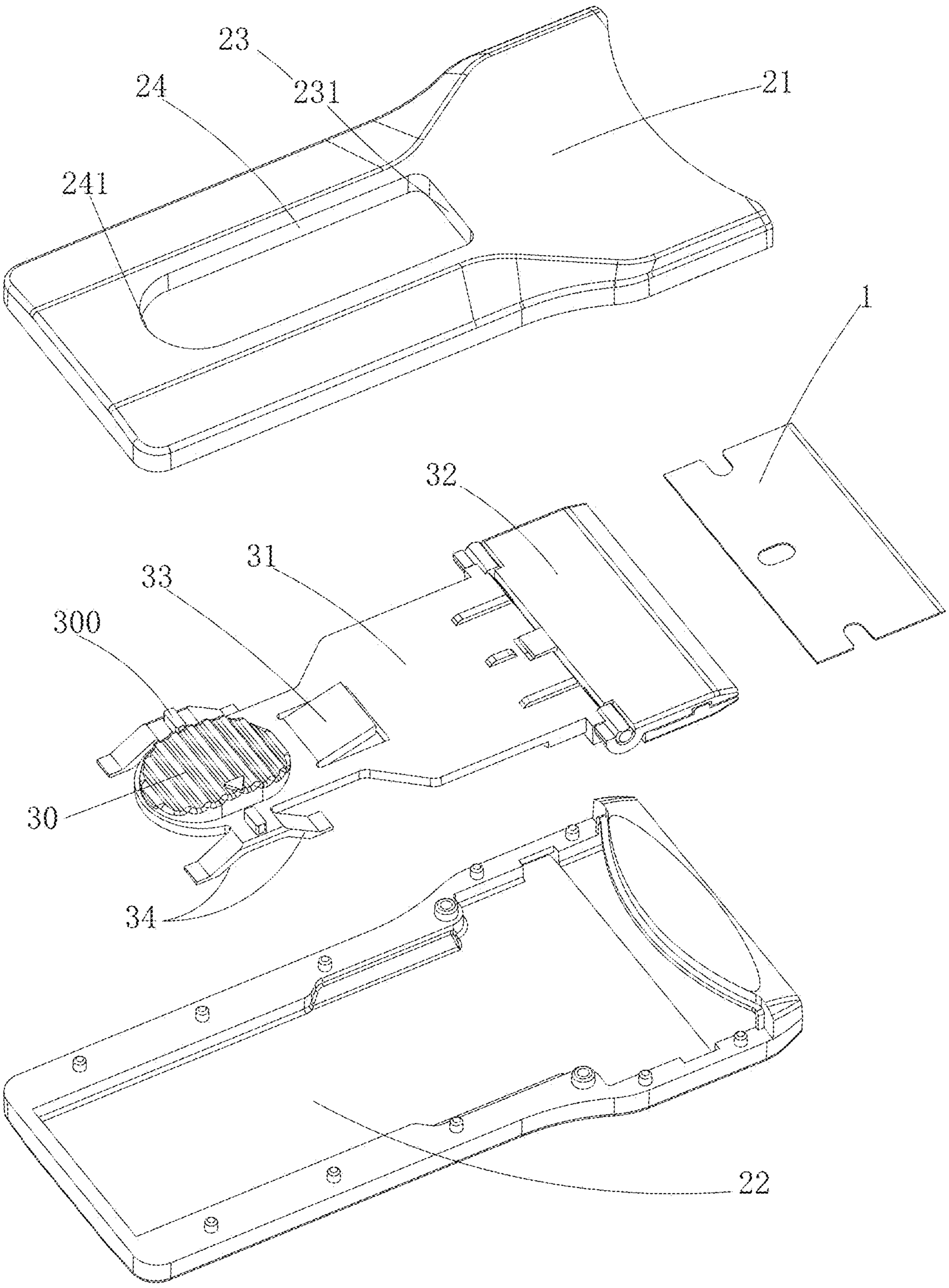
FIG. 13 is an exploded view of the scraper according to the embodiment II of the present disclosure.
Figure 14:
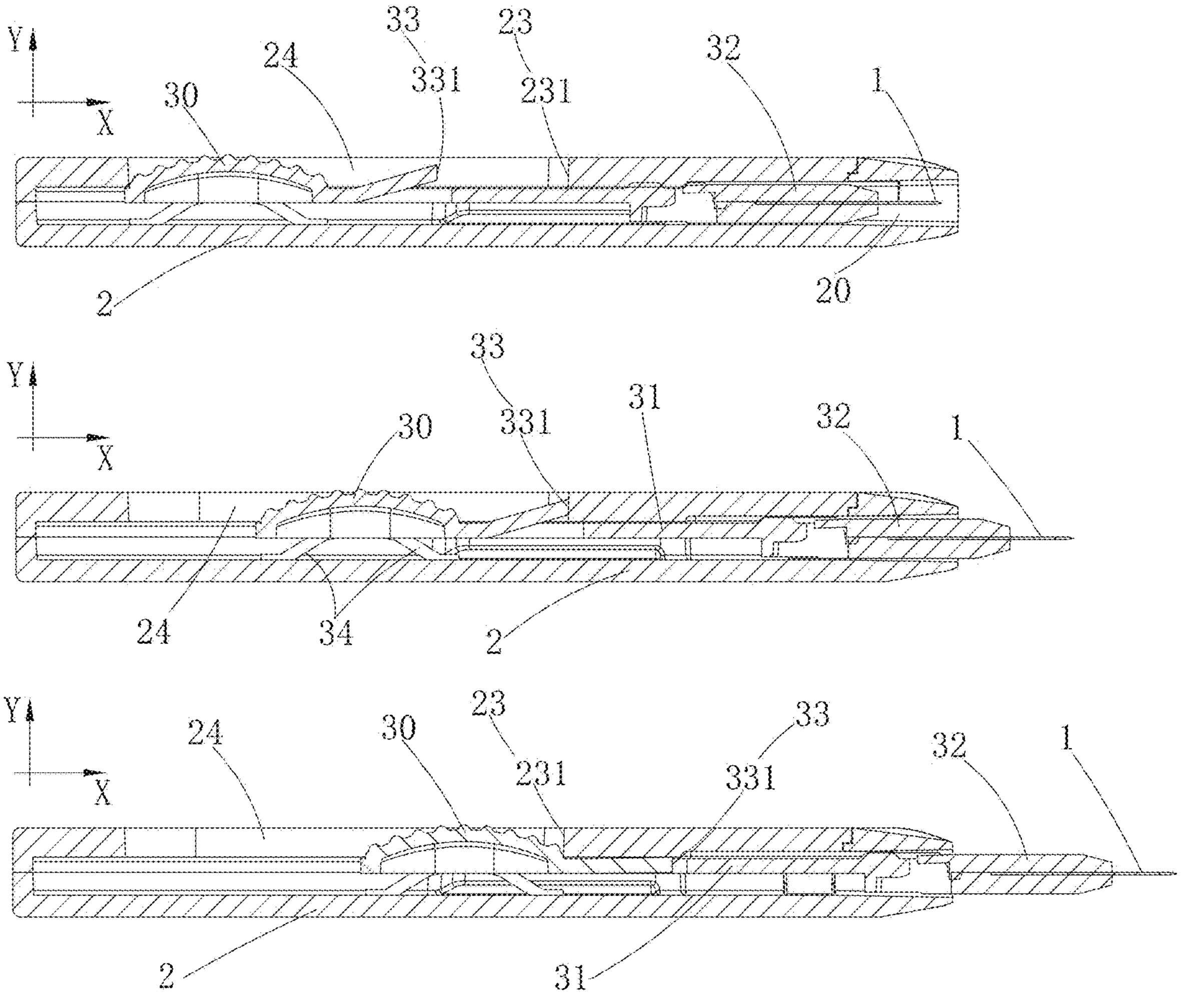
FIG. 14 is a cross-sectional view of the scraper according to the embodiment II of the present disclosure.

In order to facilitate the user to control the limiting end 331 to disengage from the limiting wall 231, the scraper further includes an auxiliary button 4, as shown in FIGS. 4, 6, and 10, the auxiliary button 4 is movably connected to the housing 2. When the connection member 3 is slid to the second position, the auxiliary button 4 is disposed corresponding to the limiting end 331. The auxiliary button 4 may be pressed to push the limiting end 331 to stop abutting against the limiting wall 231. Specifically, the second limiting portion 33 includes an outer surface 3300 formed by extending from the fixation end 330 toward the limiting end 331. The auxiliary button 4 is arranged with an inclined avoidance surface 40. When the connection member 3 is slid to the second position, the avoidance surface 40 is attached to the outer surface 3300, and attachment of the avoidance surface 40 and the outer surface 3300 can improve a contact area between the auxiliary button 4 and the second limiting portion 33. In this way, when the user presses the auxiliary button 4, the applied force can be effectively transmitted to the second limiting portion 33, causing the limiting end 331 to be disengaged from the limiting wall 231.

In the present embodiment, the auxiliary button 4 is a movable button 42 independently mounted on the housing 2. A bottom of the movable button 42 is attached to the limiting end 331, as shown in FIG. 4, FIG. 5, FIG. 6, FIG. 7, and FIG. 10, and the movable button 42 is arranged with two radially-extending connection blocks 420. The two connection blocks 420 are symmetrically disposed. Two limiting slots may be defined in an inner wall of the housing 2 for assembling the two connection blocks 420 respectively. The connection blocks 420 are fixedly connected to the limiting slots, such the movable button 42 cannot move along the sliding direction of the connection member 3. The two connection blocks 420 enable a middle part of the movable button 42 to be suspended. By pressing the movable button 42, the bottom of the movable button 42 may be disposed close to and compress the limiting end 331 to enable the limiting end 331 to be disengaged from the limiting wall 231. A top of the movable button 42 is exposed out of the housing 2, facilitating the user to press the movable button 42 by a finger.

As shown in FIG. 1-FIG. 5, the housing 2 further defines a guiding hole 24 through which the operation button 30 is exposed. The guiding hole 24 is an elongated round hole, and a length direction of the guiding hole 24 is the same as the sliding direction of the connection member 3. In this way, when the operation button 30 slides along the length direction of the guiding hole 24, the blade 1 is driven to be moved in and out of the storage cavity 20. For illustration, the guiding hole 24 has a first end portion 241 and a second end portion 242 away from the first end portion 241. The first end portion 241 is disposed away from the opening 200 of the storage cavity 20, and the second end portion 242 is disposed close to the opening 200 of the storage cavity 20. When the blade 1 is in the storage state, the operation button 30 is at the first end portion 241; when the blade 1 is in the replaceable state, the operation button 30 is at the second end portion 242; and when the blade 1 is in the operating state, the operation button 30 is a position between at the first end portion 241 and the second end portion 242. Therefore, when the user is using the scraper, the user pushes and slides the operation button 30 from the first end portion 241 to the second end portion 242. When the second limiting portion 33 is engaged with the first limiting portion 23, the blade 1 is in the operating state. The user needs to apply a force perpendicular to the sliding direction of the connection member 3 to the second limiting portion 33 or the first limiting portion 23, such that after the second limiting portion 33 is disengaged from the first limiting portion 23, the operation button 30 may be pushed to the second end portion 242, i.e., the blade 1 is in the replaceable state.

In some embodiments, the connection member 3 further includes a resilient portion 34, the resilient portion 34 is disposed corresponding to the operation button 30. Since the operation button 30 and the external portion 32 are distributed at the two end portions of the body portion 31 that are away from each, the body portion 31 is connected to the housing 2 through the resilient portion 34 and the external portion 32 disposed at the two end portions. In this way, an avoidance space 201 is formed inside the body portion 31 and the housing 2. Pressing the operation button 30 may cause an end of the body portion 31 to move towards the avoidance space 201. Therefore, the operation button 30 is further arranged with a limiting protrusion 300. An inner side of the housing 2 defines two first limiting snap slots 28 snapped with the limiting protrusion 300. As shown in FIGS. 4, 5, and 9, the operation button 30, takes the resilient force of the resilient portion 34, enables the limiting protrusion 300 to be snapped with either of the first limiting snap slots 28. The two first limiting snap slots 28 are spaced apart from each other and are distributed along the sliding direction of the connection member 3. When the connection member 3 is at the first position, the limiting protrusion 300 is engaged with one of the two first limiting snap slots 28 disposed away from the opening 200. At this moment, the operation button 30 is located at the first end portion 241 of the guiding hole 24, and the scraper is in the storage state. When the connection member 3 is at the second position, the limiting protrusion 300 is engaged with the other one of the two first limiting slots 28 away from the opening 200. At this moment, the operation button 30 is disposed between the first end portion 241 and the second end portion 242 of the guiding hole 24, the limiting end 331 abuts against the limiting wall 231, and the scraper is in the operating state. By arranging the limiting protrusion 300 at the operation button 30, the blade 1 can be maintained in the storage state or in the operating state. That is, when the operation button 30 is not pressed, the blade 1 in the operating state is subjected to dual snapping effects, where the dual snapping effects include snapping of the first limiting portion 23 and the second limiting portion 33, and snapping of the limiting protrusion 300 and the first limiting snap slot 28. In this way, stability of the blade 1 in the operating state is improved, the dual snapping effects further avoids one-handed misoperation performed by the user.

In some embodiments, two resilient portions 34 are arranged and are symmetrically disposed at an end of the operation button 30. The resilient portion 34 includes two resilient supports 340 as shown in FIGS. 8 and 9. Ends of the two resilient supports 340 are disposed close to each other and are connected to the operation button 30, and the other ends of the two resilient supports 340 are disposed away from each other and abut against the housing 2 to form support. As shown in FIG. 4, the guiding hole 24 is defined in the upper housing 21, and the resilient supports 340 abut against the inner wall of the housing 2.

Figure 3:
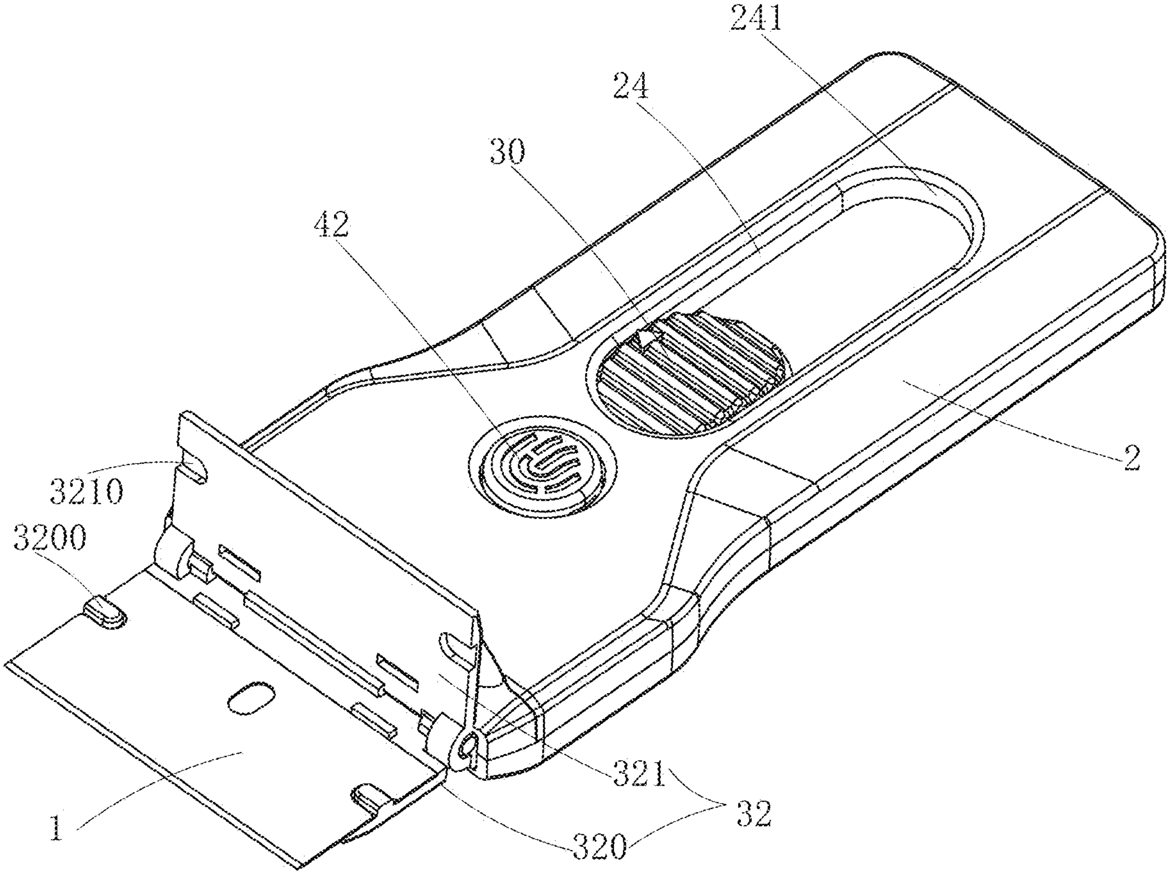
FIG. 3 is a structural schematic view III of the entire scraper according to the embodiment I of the present disclosure, where the blade is in a replaceable state.

In some embodiments, in order to facilitate replacement of the blade 1, the external portion 32 includes: a fixation plate 320 and a movable plate 321. As shown in FIG. 3, the fixation plate 320 is integrally formed with the body portion 31. The fixation plate 320 is arranged with a plurality of snap protrusions 3200 to limit the blade 1 from sliding. The movable plate 321 defines a plurality of snap holes 3210 corresponding to the plurality of snap protrusions 3200. The movable plate 321 includes a hinged end and a free end. The hinged end is hinged to the body portion 31; the free end may swing around the hinged end. When the movable plate 321 is snapped to the fixation plate 320, the blade 1 is clamped and fixed by the snap holes 3210 and the snap protrusions 3200. Specifically, the snap protrusions 3200 on the fixation plate 320 are disposed at positions more corresponding to holes on the blade 1. The blade 1 may be any conventional blade in the art, which is not limited herein. The blade 1 may be replaced as follows. When the blade 1 slides to the replaceable state, the free end of the movable plate 321 may be bent to cause the movable plate 321 to swing, such that the blade 1 may be removed from the fixation plate 320, and a new blade 1 may be snapped into the corresponding snap protrusion 3200 on the fixation plate 320 and may be clamped and fixed by the movable plate 321.

Being different from embodiment I, in the other embodiments, the second limiting portion 33 may be configured as other resilient structures, the first limiting portion 23 may be configured as other limiting structures, the auxiliary buttons 4 may be configured in other manners, the body portion 31 may be configured as other structures, and so on, such that scrapers in other configurations may be obtained. In the following embodiments, any un-described portion may be similar to those in the embodiment I and will not be repeatedly described.

Embodiment II

An overall structure of the scraper is shown in FIG. 11-FIG. 14, in the present embodiment, the limiting wall 231 is arranged on an inner wall of the second end portion 242 of the guiding hole 24. Since the limiting end 331 is inclined away from the body portion 31, the limiting end 331, when being not subject to any external force, is placed inside the guiding hole 24. That is, when the connection member 3 is at the first position, the operating button 30 is disposed at the first end portion 241, the limiting end 331 is disposed in the guiding hole 24, and the scraper is in the storage state. When the connection member 3 is at the second position, the operation button 30 is disposed between the first end portion 241 and the second end portion 242, the limiting end 331 abuts against the limiting wall 231, and the scraper is in the operating state. Since the limiting end 331 is exposed out of the housing 2 through the guiding hole 24, the user can directly contact the limiting end 331. Therefore, when the connection member 3 is at the second position, the user directly presses the outer surface 3300 of the second limiting portion 33, so as to enable the limiting end 331 disengage from the contact with the limiting wall 231, and the user may continue to control the operation button 30 to push the connection member 3 towards the opening 200, such that the connection member 3 can be pushed to reach the third position. At this moment, the operation button 30 is at the second end portion 242, the limiting end 331 is in the storage cavity 20, and the blade 1 completely extends out of the storage cavity 20 and is in the replaceable state. The user may control the operation button 30 to make the connection member 3 slide in the direction away from the opening 200, such that the scraper can be switched from the replaceable state of the blader 1 to the operating state or the storage state.

Embodiment III

Figure 15:
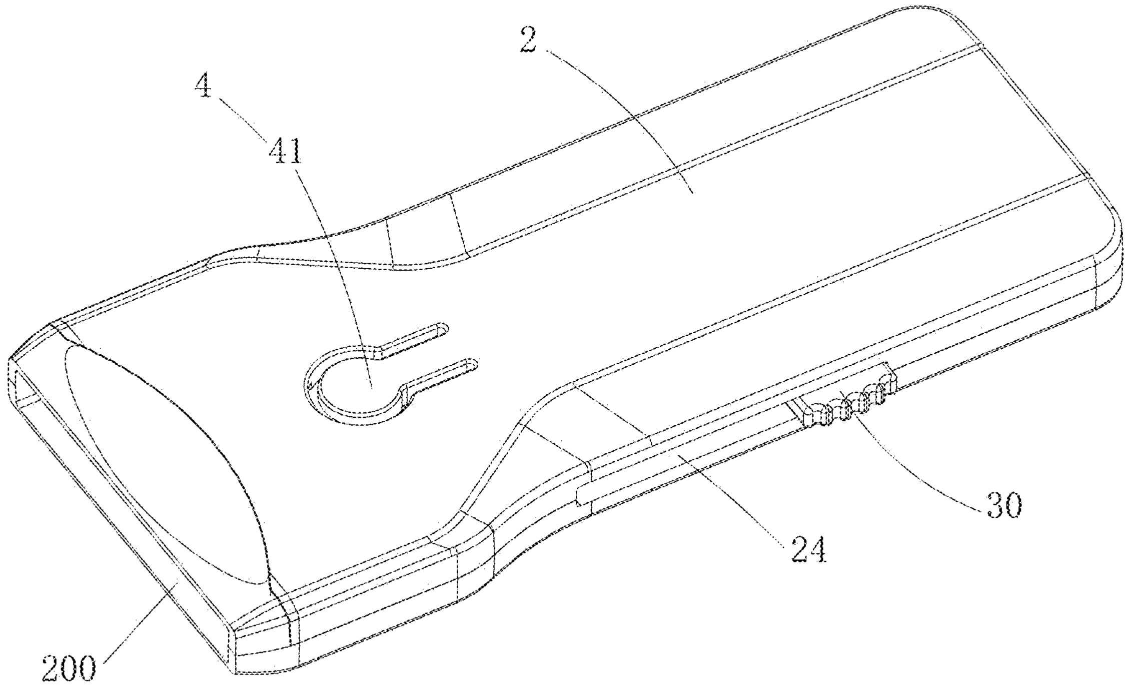
FIG. 15 is a structural schematic view I of the entire scraper according to an embodiment III of the present disclosure, where the blade is in the storage state.
Figure 16:
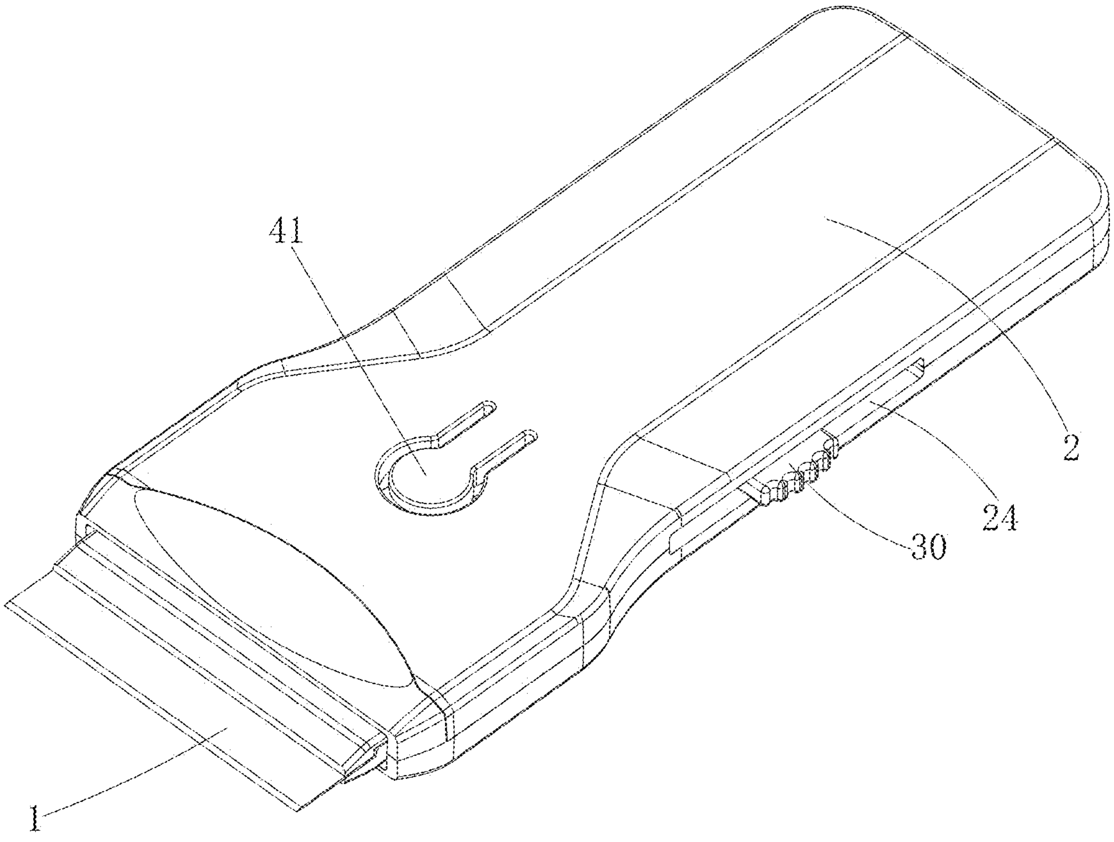
FIG. 16 is a structural schematic view II of the entire scraper according to the embodiment III of the present disclosure, where the blade is in the operating state.
Figure 17:
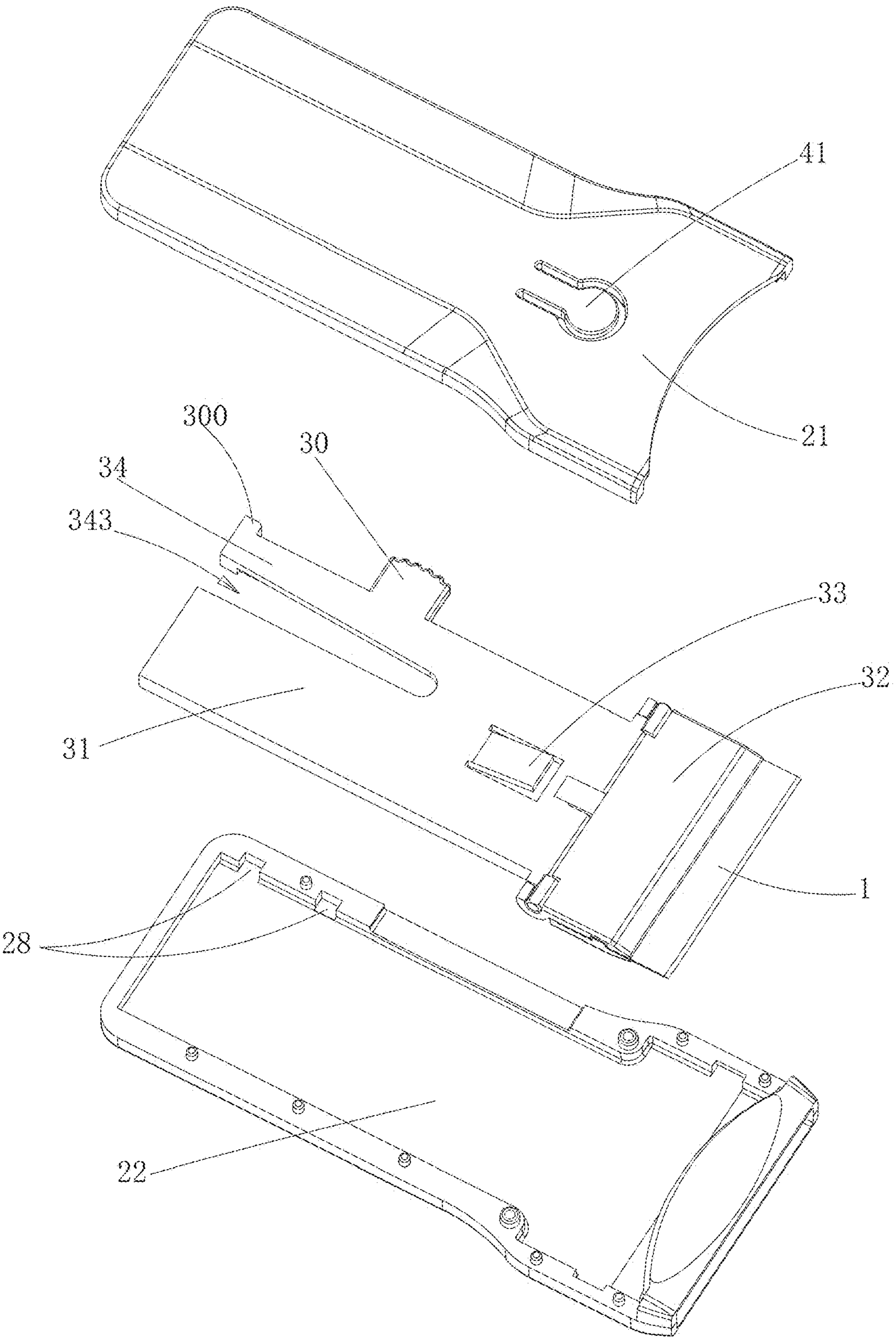
FIG. 17 is an exploded view of the scraper according to the embodiment III of the present disclosure.
Figure 18:
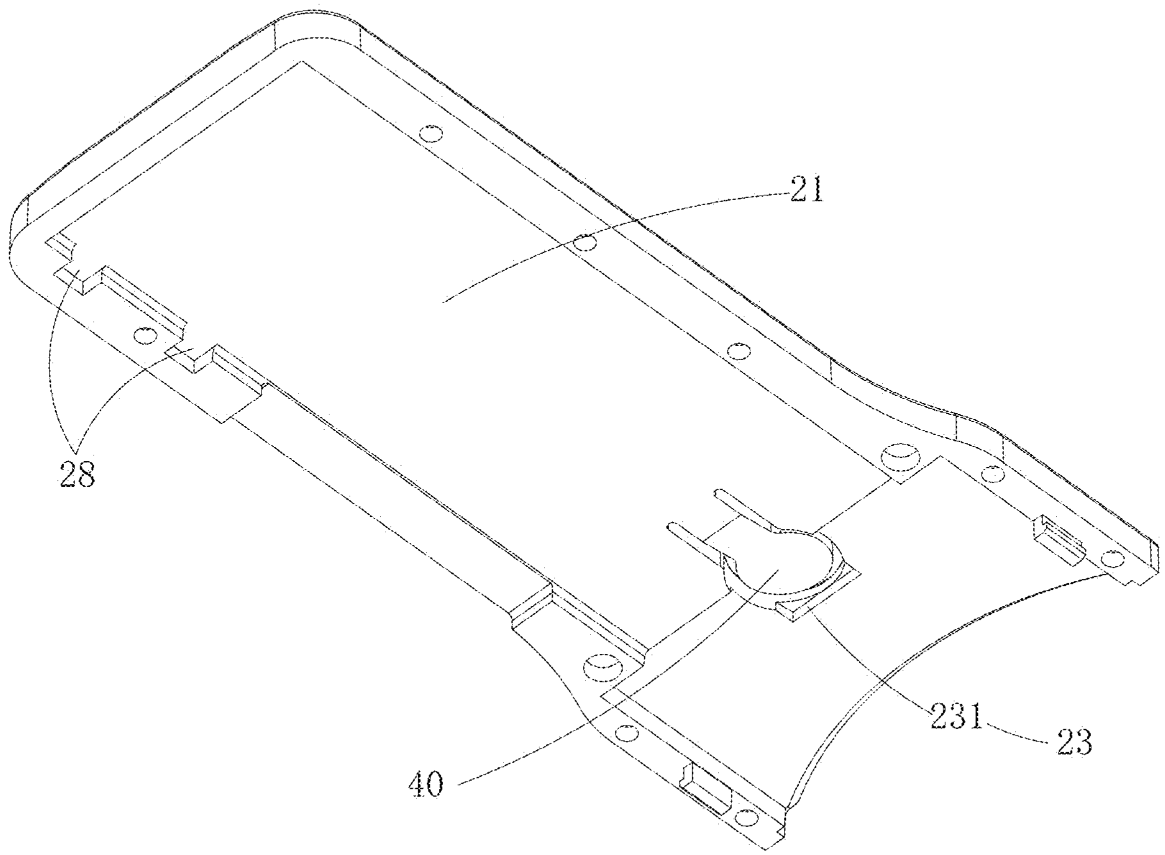
FIG. 18 is a structural schematic view of the housing according to the embodiment III of the present disclosure.

An overall structure of the scraper is shown in FIG. 15-FIG. 20, in the present embodiment, the auxiliary button 4 includes a resilient pressing sheet 41 integrally formed with the housing 2. As shown in FIGS. 15, 17, and 18, and the resilient pressing sheet 41 is formed by defining a substantially U-shaped seam in the housing 2, enabling the resilient pressing sheet 41 to be deformable. When the resilient pressing sheet 41 is not subjected to an external force, the resilient pressing sheet 41, due to having the inclined avoidance surface 40, does not interfere with the abutting between the limiting end 331 and the limiting wall 231. A bottom of the resilient pressing sheet 41 is attached to the limiting end 331. Therefore, when the user presses on the resilient pressing sheet 41, the limiting end 331 may be detached from the limiting wall 231. The integrally formed resilient pressing sheet 41 allows a processing cost of the scraper to be reduced and allows the scraper to be configured to be flatter and thinner, such that the scraper can be conveniently stored and carried by the user.

Figure 19:
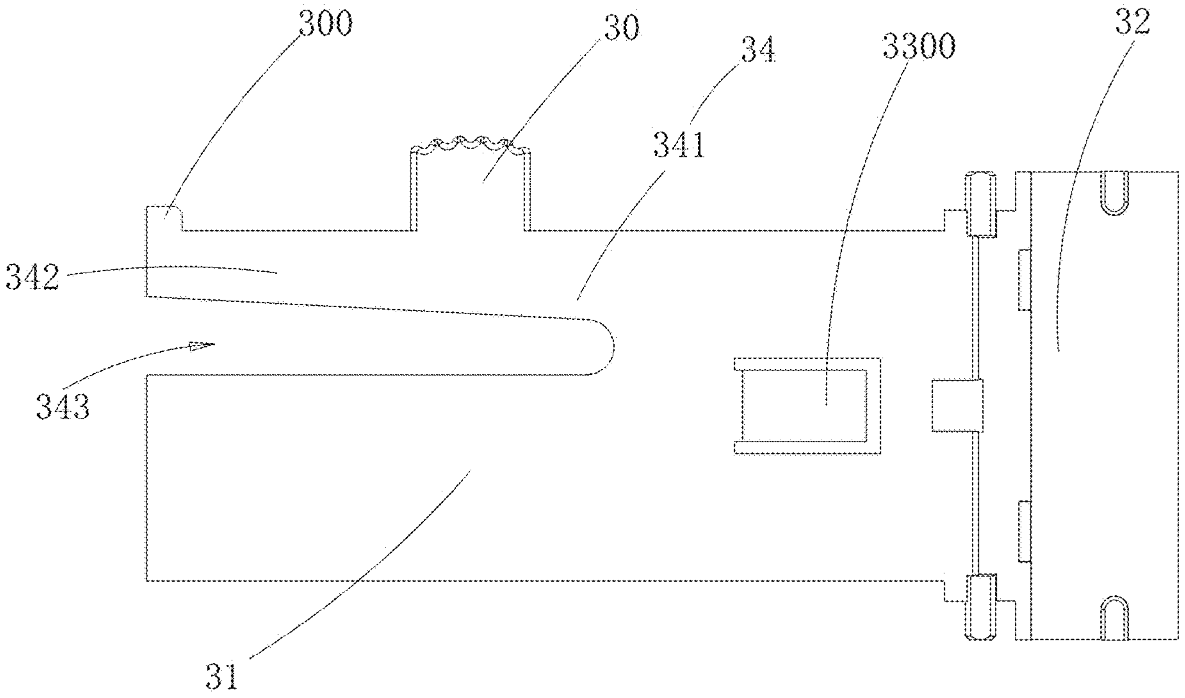
FIG. 19 is a top plane view of the connection member according to the embodiment III of the present disclosure.
Figure 20:
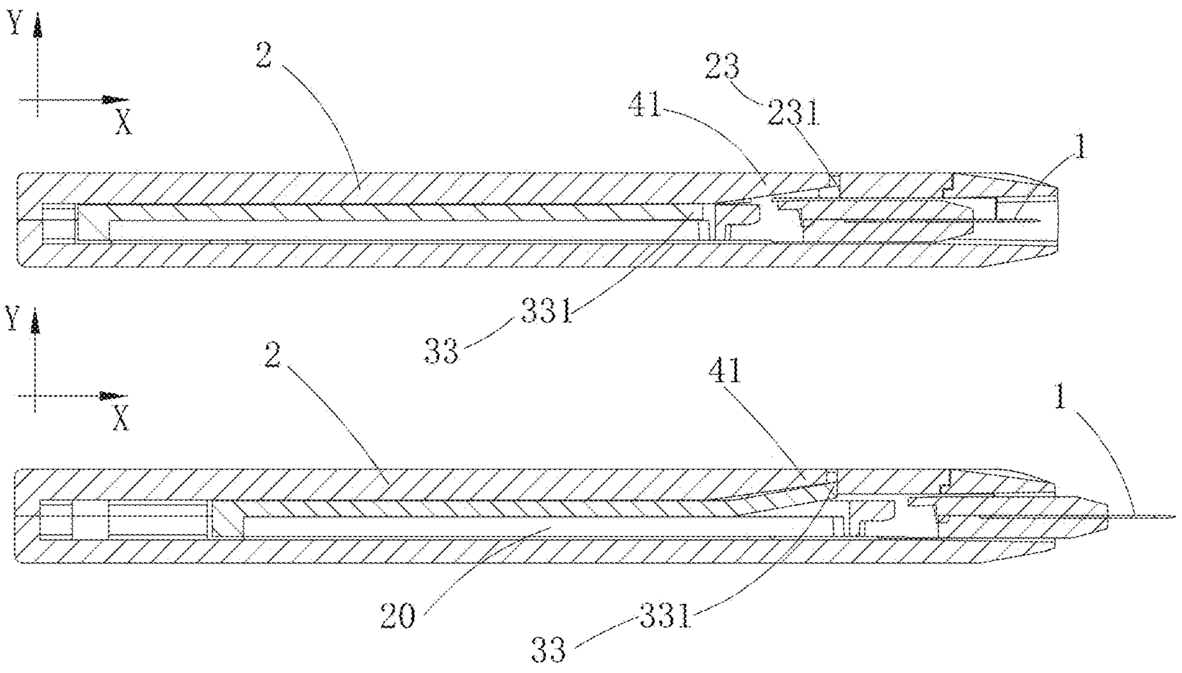
FIG. 20 is a perspective cross-sectional view of the scraper according to the embodiment III of the present disclosure.
Figure 21:
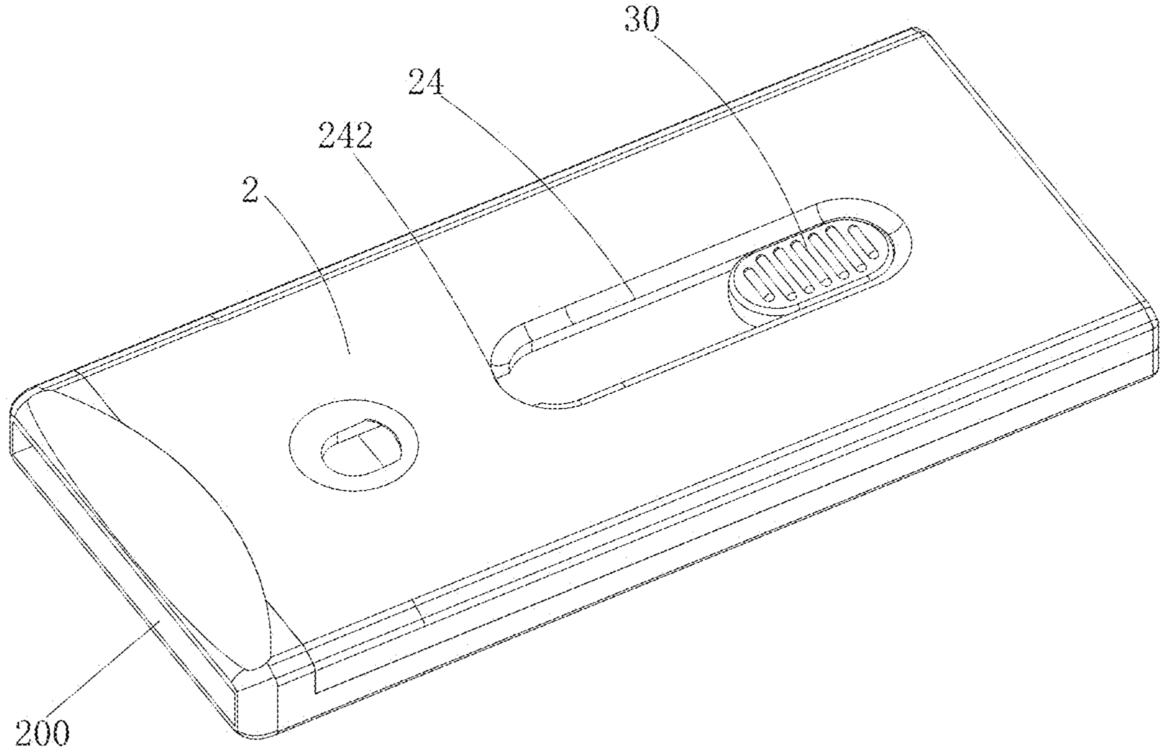
FIG. 21 is a structural schematic view I of the entire scraper according to an embodiment IV of the present disclosure, where the blade is in the storage state.
Figure 22:
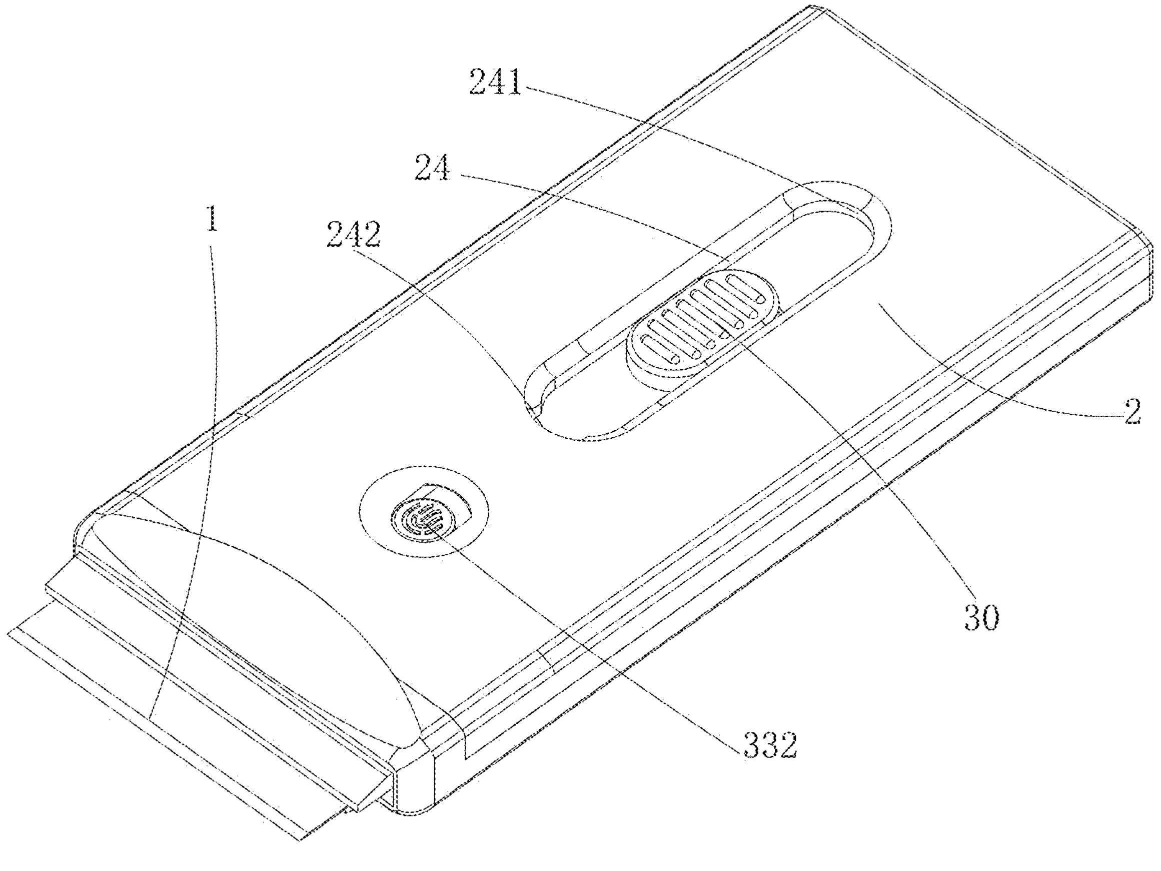
FIG. 22 is a structural schematic view II of the entire scraper according to the embodiment IV of the present disclosure, where the blade is in the operating state.
Figure 23:
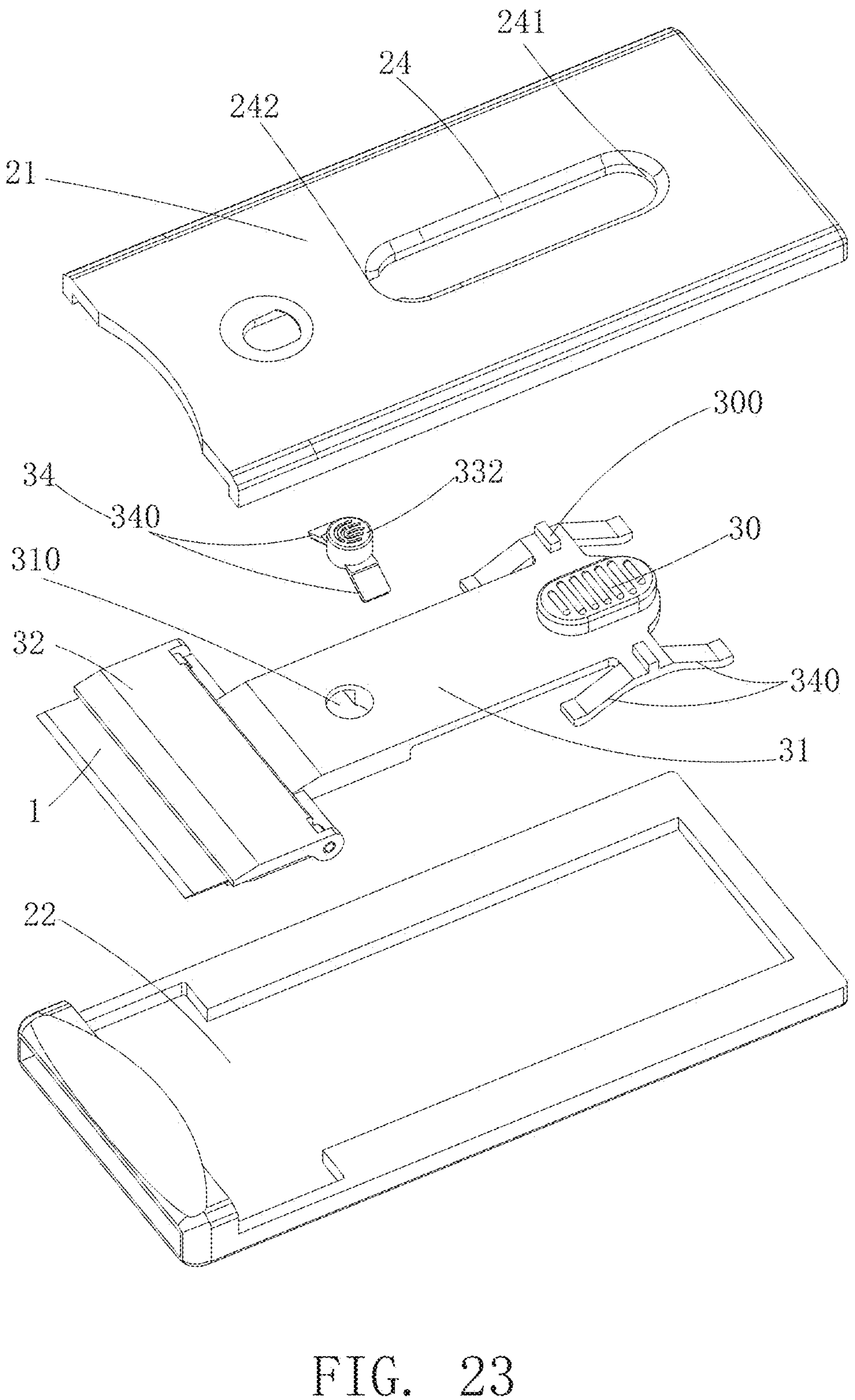
FIG. 23 is an exploded view of the scraper according to the embodiment IV of the present disclosure.
Figure 24:
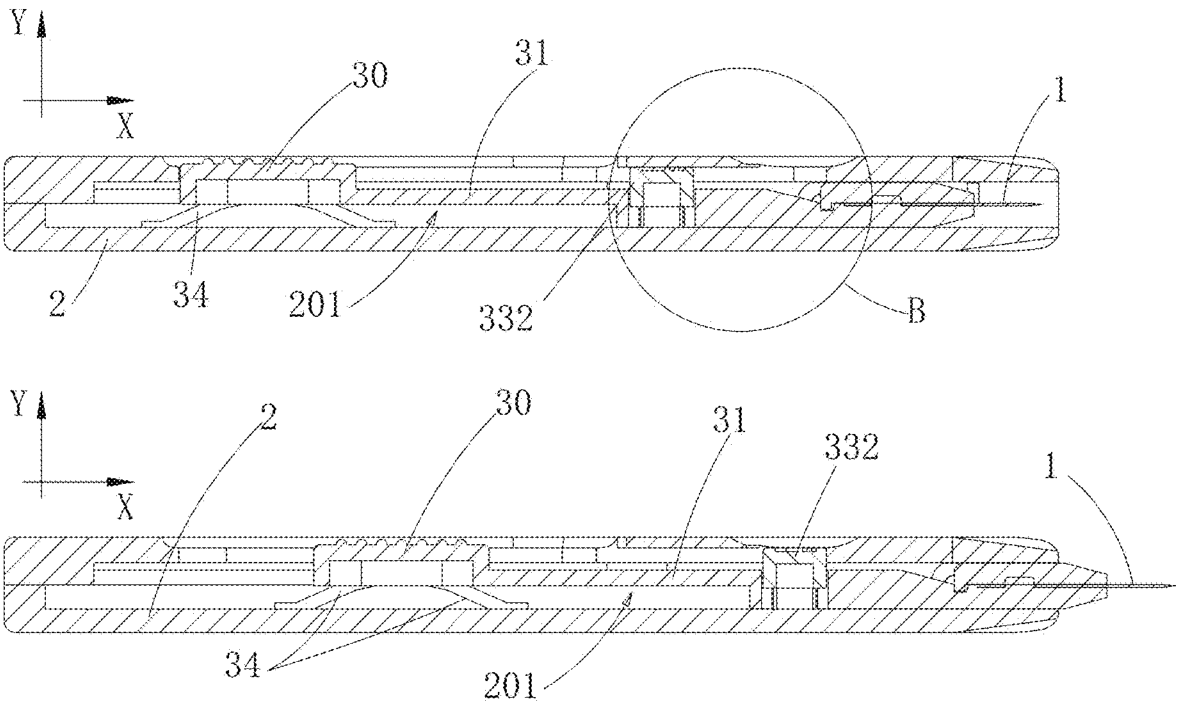
FIG. 24 is a perspective cross-sectional view of the scraper according to the embodiment IV of the present disclosure.
Figure 25:
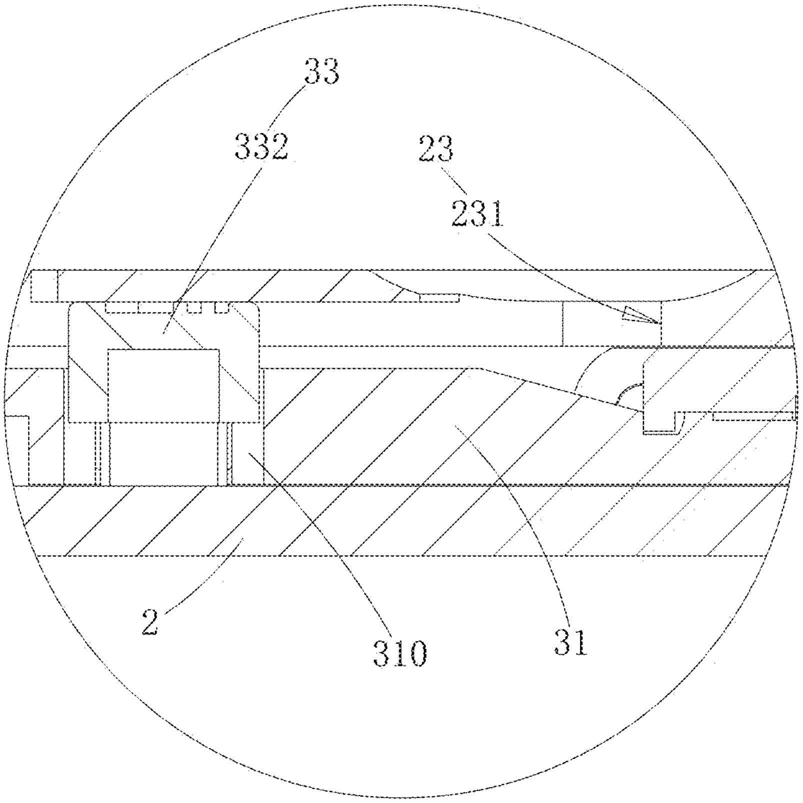
FIG. 25 is an enlarged view of a portion B shown in FIG. 24.
Figure 26:
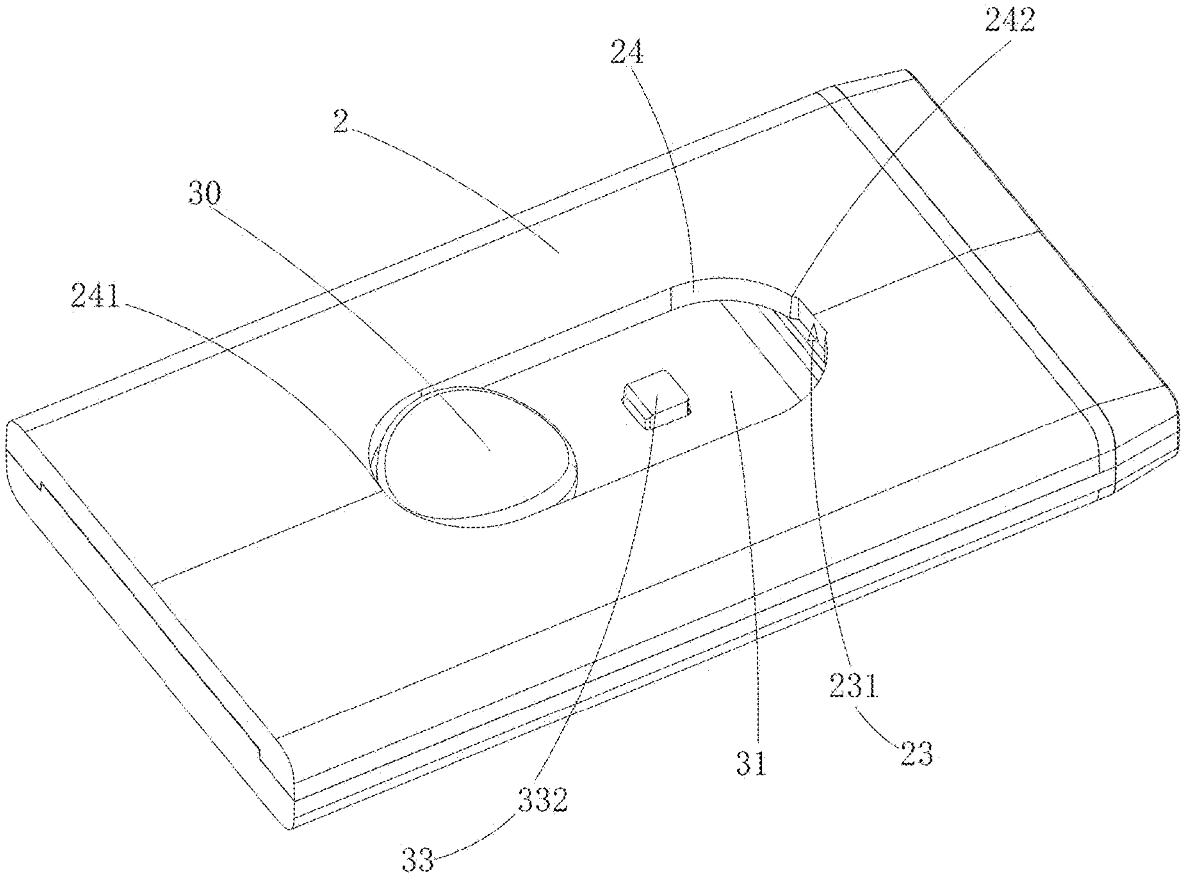
FIG. 26 is a structural schematic view I of the entire scraper according to an embodiment V of the present disclosure, where the blade is in the storage state.
Figure 27:
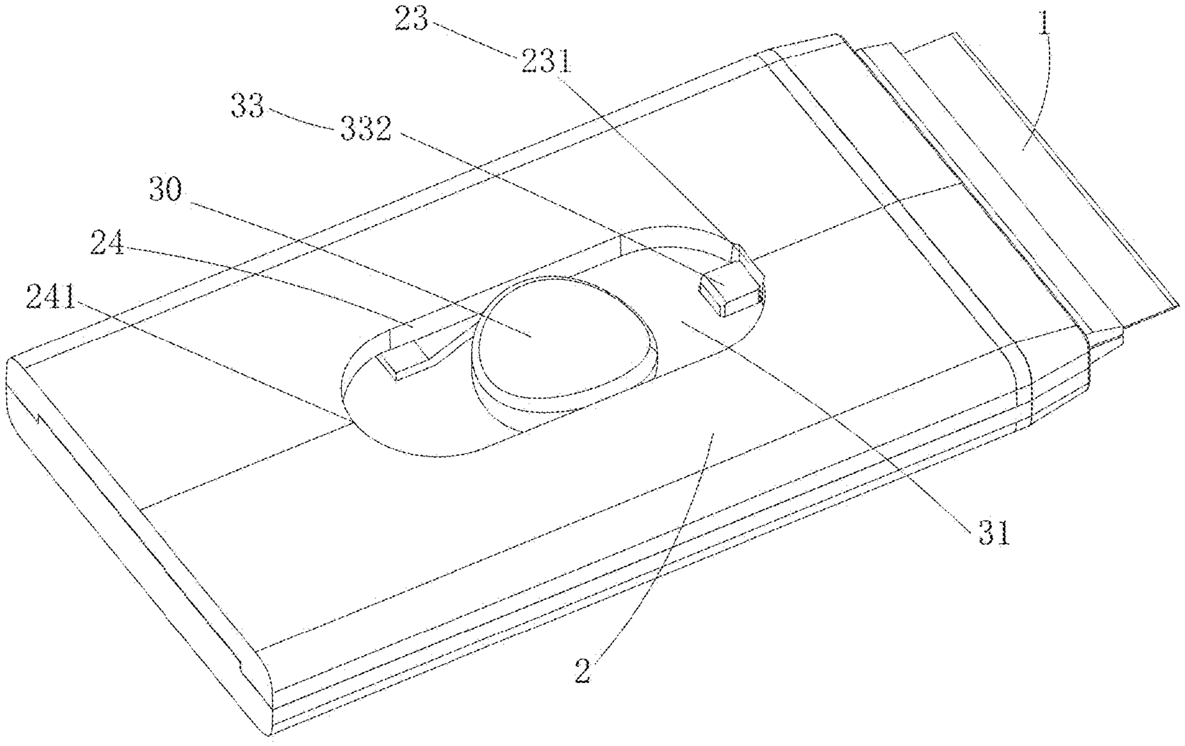
FIG. 27 is a structural schematic view II of the entire scraper according to the embodiment V of the present disclosure, where the blade is in the operating state.
Figure 28:
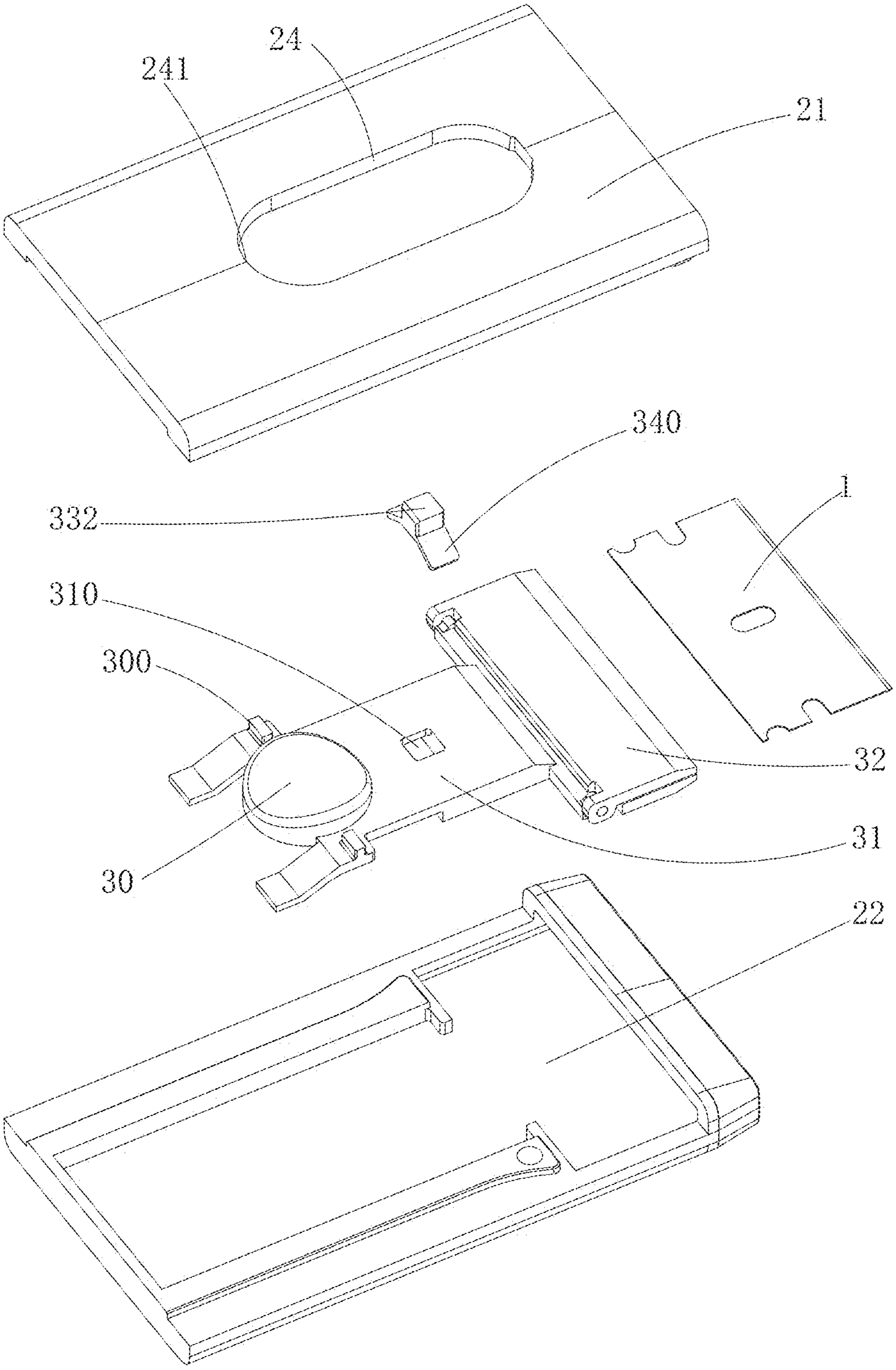
FIG. 28 is an exploded view of the scraper according to the embodiment V of the present disclosure.
Figure 29:
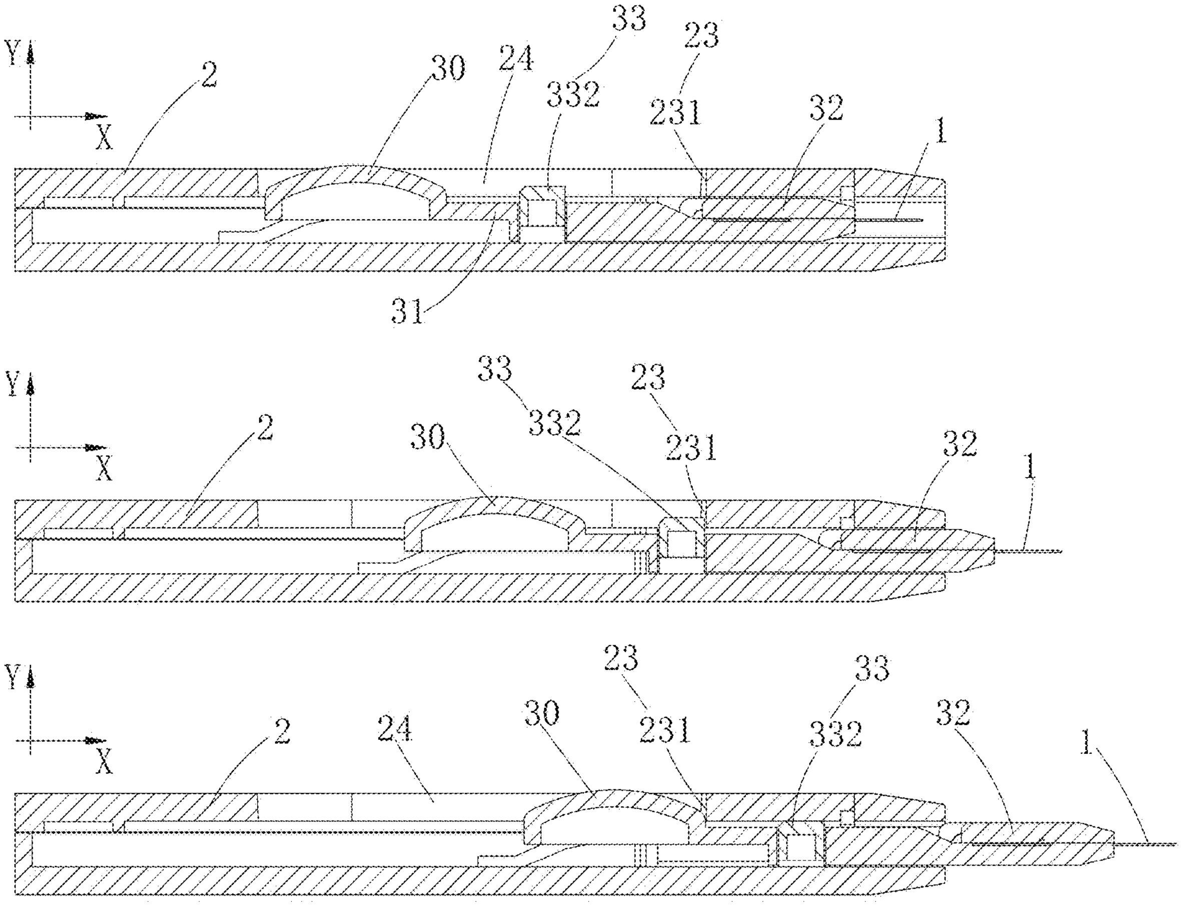
FIG. 29 is a perspective cross-sectional view of the scraper according to the embodiment V of the present disclosure.
Figure 30:
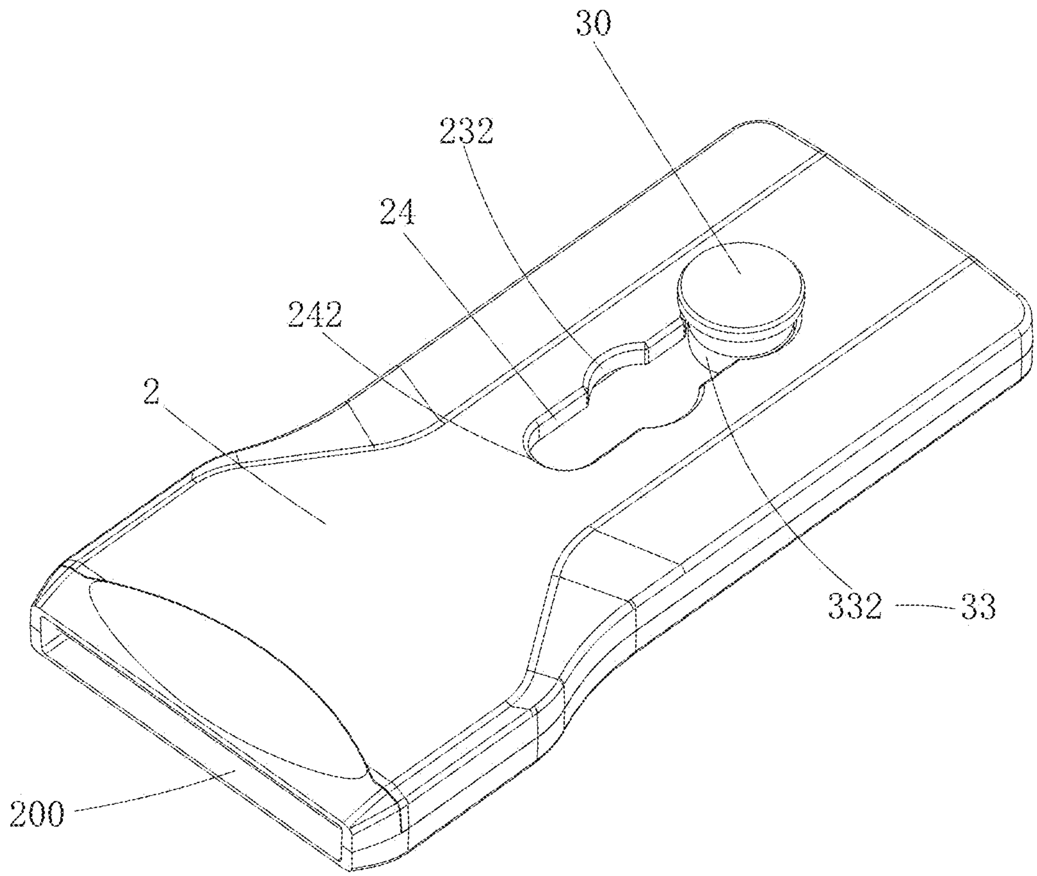
FIG. 30 is a structural schematic view I of the entire scraper according to an embodiment VI of the present disclosure, where the blade is in the storage state.
Figure 31:
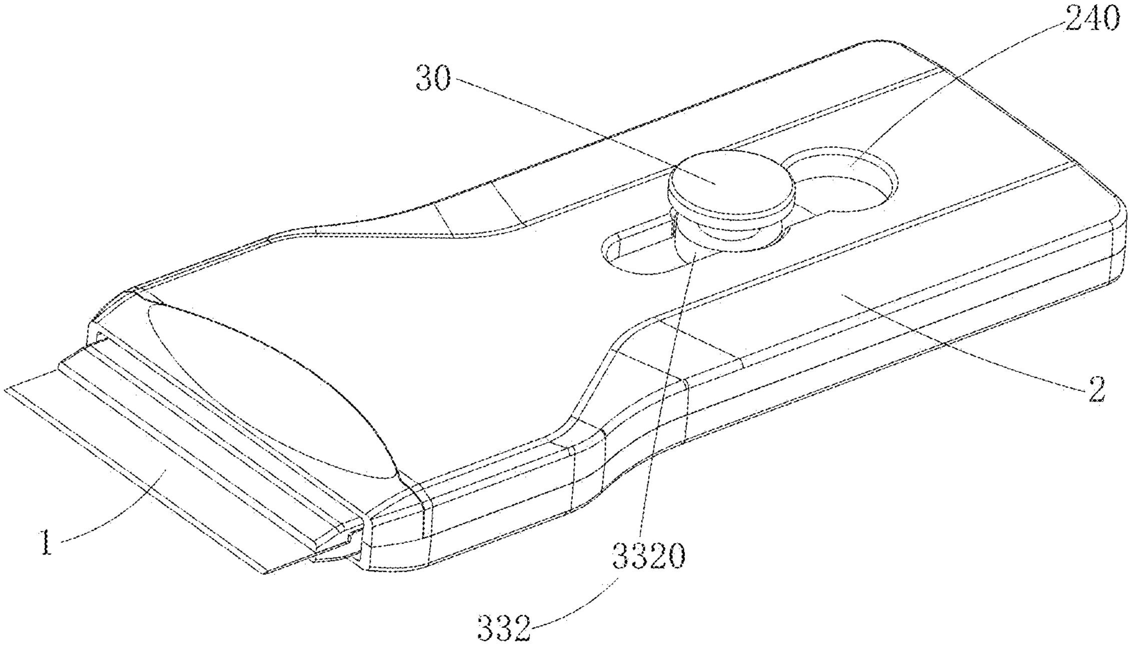
FIG. 31 is a structural schematic view II of the entire scraper according to the embodiment VI of the present disclosure, where the blade is in the operating state.

As shown in FIG. 16, in the scraper, the guiding hole 24 is defined in a side of the housing 2, and that is, the guiding hole 24 is defined in a thickness direction of the housing 2. Specifically, the resilient portion 34 includes a connection end 341 and a movable end 342. As shown in FIG. 17 and FIG. 19, the connection end 341 is connected to an outer side wall of the body portion 31, the movable end 342 is connected to the operation button 30. A narrow resilient space 343 is formed between the resilient portion 34 and the outer side wall of the body portion 31. The movable end 342 may be resiliently displaced towards the resilient space 343. In the present embodiment, the resilient portion 34 is an elongated rod or plate. The connection member 3 as a whole is made of deformable plastics. In this way, the movable end 342, when being subjected to an external force, may move closer towards the body portion 31 along the resilient space 343. The movable end 342, when being not subjected to an external force, moves away from the outer side wall of the body portion 31 based on resilient performance of the movable end 342 itself. Accordingly, the limiting protrusion 300 is disposed at a most end of the movable end 342, and the first limiting snap slot 28 is defined in the side wall of the housing 2. The resilient portion 34 of the present embodiment is configured in the case where the guiding hole 24 is defined in the side of the housing 2. The operation button 30 connected to the movable end 342 is exposed out of the housing 2 through the guiding hole 24. In this way, the thickness of the housing 2 may be reduced, and the scraper may be flatter.

Embodiment IV

An overall structure of the scraper is shown in FIG. 21-FIG. 25, in the present embodiment, the second limiting portion 33 is configured as a resilient and independent button, and no auxiliary button 4 is arranged on the housing 2. Specifically, the second limiting portion 33 includes a limiting button 332 and a resilient portion 34 connected to the limiting button 332. The body portion 31 defines a mounting hole 310 in which the limiting button 332 may be mounted. The limiting button 332 is slidable along an axial direction of the mounting hole 310, the axial direction of the mounting hole 310 is perpendicular to the sliding direction of the connection member 3, such that the limiting button 332 can slide together with the connection member 3. In the present embodiment, the resilient portion 34 is configured as the resilient supports 340 being the same as those in the Embodiment I. The resilient supports 340 provide a resilient force for the limiting button 332 to be reset. When the connection member 3 is slid to the second position, the limiting button 332 abuts against the limiting wall 231 under the resilient force of the resilient supports 340, and at this moment, a through hole may be defined in the housing 2 at a position corresponding to the limiting wall 231 to enable the limiting button 332 to be exposed out of the housing 2, facilitating the user to press the limiting button 332. In the present embodiment, during a process of the connection member 3 being slid from the first position to the second position and from the second position to the third position, the top of the limiting button 332 abuts against the inner side of the housing 2, and the resilient supports 340 are compressed by the housing 2 to store resilient energy. Only when the connection member 3 is at the second position, the limiting button 332 is exposed out of the housing 2 through the through hole, and the limiting button 332 abuts against the limiting wall 231, and the resilient supports 340 are released from storing the resilient energy. When the connection member 3 is at the second position, the user may directly press the limiting button 332 to disengage the limiting button 332 from the limiting wall 231. At this moment, the user may control the operation button 30 to drive the connection member 3 to continue sliding towards the opening 200, such that the blade 1 may be completely extended out of the storage cavity 20 to be replaced by the user. To be noted that the resilient portion 34 may alternatively be configured as a compression spring or the like.

Embodiment V

An overall structure of the scraper is shown in FIG. 26-FIG. 29, in the present embodiment, the limiting wall 231 is arranged at the second end portion 242 of the guiding hole 24, and the second limiting portion 33 is configured as the limiting button 332 and the resilient supports 340 as shown in the Embodiment IV. Details about the limiting wall 231 being arranged on the inner wall of the second end portion 242 of the guiding hole 24 has already been described in the Embodiment II, which will not be repeated herein. That is, the scraper provided in the present embodiment is used in a manner similar to that of Embodiment II. However, in the present embodiment, the user may directly press the limiting button 332 through the guiding hole 24 to drive the limiting button 332 to be disengaged from the limiting wall 231.

Embodiment VI

Figure 34:
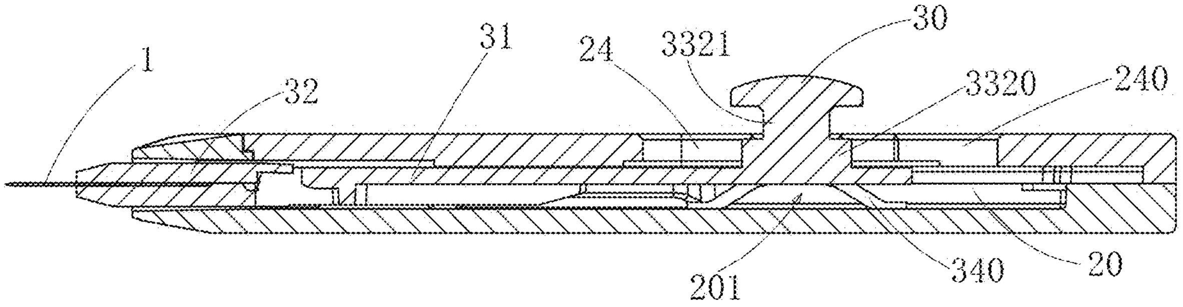
FIG. 34 is a perspective cross-sectional view of the scraper according to the embodiment VI of the present disclosure.

An overall structure of the scraper is shown in FIG. 30-FIG. 33, in the present embodiment, the second limiting portion 33 includes a limiting button 332, and the first limiting portion 23 is arranged on the guiding hole 24. Specifically, the limiting button 332 is arranged at an end of the body portion 31 away from the external portion 32, and the limiting button 332 is coaxially connected with the operation button 30 of the Embodiment I. The limiting button 332 includes a limiting tab 3320 and a guiding post 3321 that is coaxially connected to the limiting tab 3320. A bottom of the limiting tab 3320 is connected to the resilient portion 34, and a top of the limiting tab 3320 is connected to the operation button 30 through the guiding post 3321. Furthermore, two resilient portions 34 are arranged to provide stable support and stable resilient resetting for the limiting button 332 and the operation button 30. In the embodiment, the first limiting portion 23 includes a limiting snap hole 232, the limiting snap hole 232 is defined in the guiding hole 24, and an inner diameter of the limiting snap hole 232 is greater than a width of the guiding hole 24. The limiting button 332 is arranged with the limiting tab 3320 that is snapped with the limiting snap hole 232. When the connection member 3 slides to the second position, the limiting tab 3320 snaps to the limiting snap hole 232. Pressing the limiting button 332 causes the limiting tab 3320 to disengage from the limiting snap hole 232. Snapping between the limiting tab 3320 and the limiting snap hole 232 limits the connection member 3 from sliding towards the opening 200. Pressing the operation button 30 causes the limiting tab 3320 to move downwardly to be disengaged from the limiting snap hole 232. At this moment, the guiding post 3321 may slide along the length direction of the guiding hole 24. As shown in FIG. 34, the resilient supports 340 allows the avoidance space 201 to be formed inside the limiting tab 3320 and the housing 2. The limiting tab 3320, when being not subjected to an external force, may enter the limiting snap hole 232 by the resilient force of the resilient portion 34. Since the width of the guiding hole 24 is less than an outer diameter of the limiting tab 3320, the coaxially connected operation button 30 cannot slide along the length direction of the guiding hole 24, such that the blade 1 is maintained in the operating state. Conversely, by pressing the operation button 30, the limiting tab 3320 may be disengage from the limiting snap hole 232. At this moment, the guiding post 3321 enters the limiting snap hole 232. Since the outer diameter of the guiding post 3321 is smaller than the width of the guiding hole 24, the guiding post 3321 is not interfered with by the inner wall of the limiting snap hole 232 and can slide along the length direction of the guiding hole 24.

Figure 32:
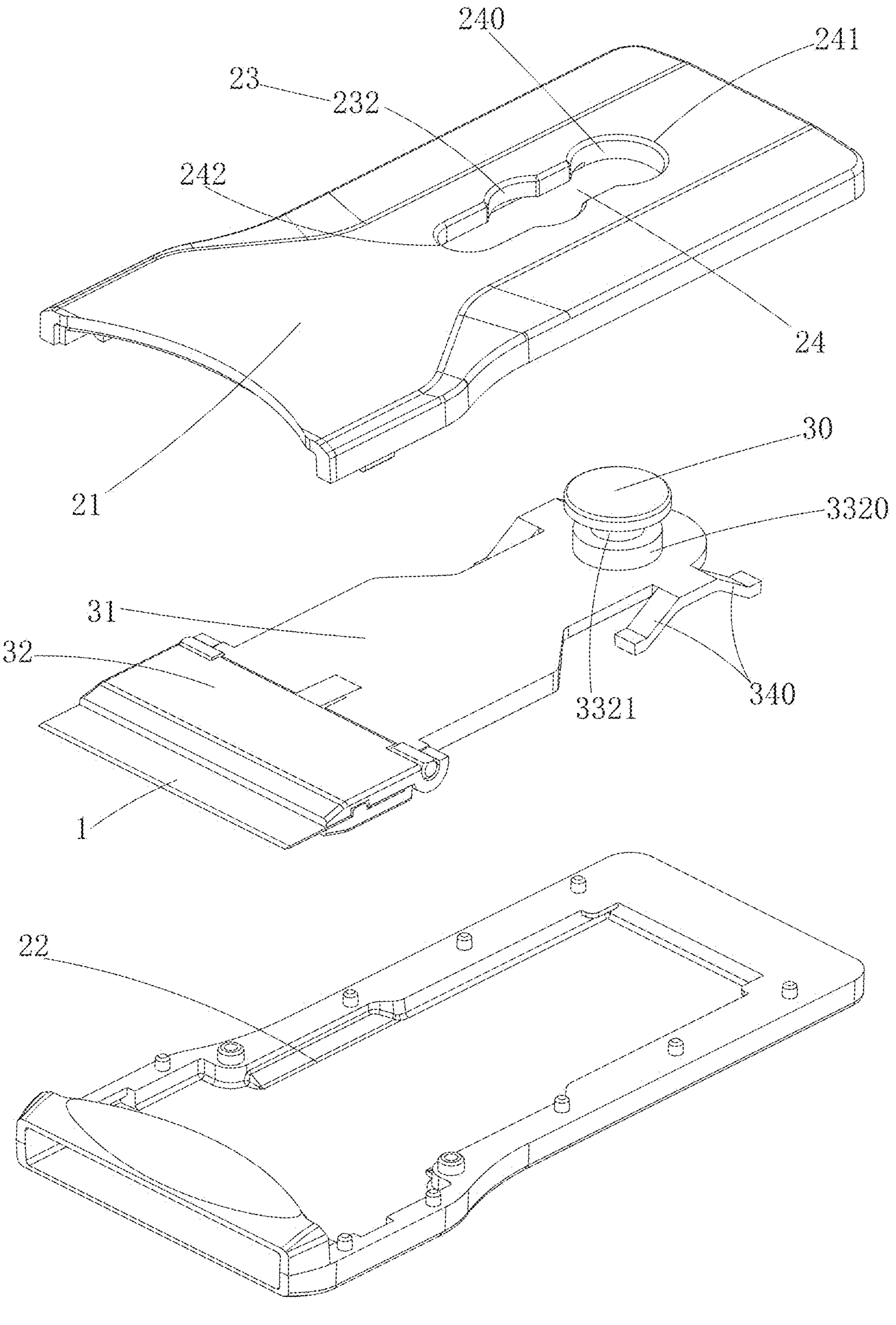
FIG. 32 is an exploded view of the scraper according to the embodiment VI of the present disclosure.
Figure 33:
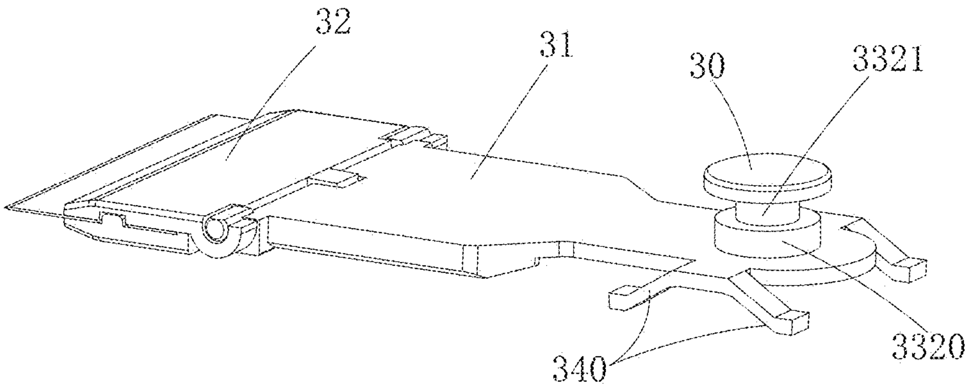
FIG. 33 is a structural schematic view of the connection member according to the embodiment VI of the present disclosure.

In some embodiments, the first end portion 241 of the guiding hole 24 defines an initial snap hole 240 that is snapped with the limiting tab 3320, as shown in FIG. 32, and a distance between the initial snap hole 240 and the opening 200 is greater than a distance between the limiting snap hole 232 and the opening 200. That is, when the connection member 3 is slid to the first position, the limiting tab 3320 is snapped with the initial snap hole 240, and the scraper is in the storage state. The snapping of the limiting tab 3320 with the initial snap hole 240 causes the operation button 30 to be unable to slide when being not pressed, avoiding a situation that, when the scraper is carried in a backpack or a pocket, the operation button 30 is driven to slide in the guiding hole 24 due to shaking.

Embodiment VII

An overall structure of the scraper is shown in FIG. 35-FIG. 42, in the present embodiment, the first limiting portion 23 is resilient and the second limiting portion 33 is non-resilient. Specifically, the second limiting portion 33 includes a second limiting snap slot 334 defined in the body portion 31; the first limiting portion 23 includes at least one limiting rod 233 and a resilient reset member 234 connected to the limiting rod 233. The limiting rod 233 is slidably mounted in the storage cavity 20, and a sliding direction of the limiting rod 233 is perpendicular to the sliding direction of the connection member 3. The limiting rod 233 is arranged with a limiting block 2330, the limiting block 2330 can be snapped to the second limiting snap slot 334. As shown in FIGS. 37, 38, 40, 41, and 42, a slide groove 26 in which the limiting rod 233 slides is defined in the inner side of the housing 2 to ensure that the limiting rod 233 slides back and forth in a single straight line in a length direction along the slide groove 26. When the limiting rod 233 is mounted inside the slide groove 26, the limiting rod 233 is attached to with the surface of the connection member 3, and correspondingly, the limiting block 2330 is configured as a radially protruding structure along the limiting rod 233, such that the limiting rod 233 in overall is an L-shaped rod.

Figure 35:
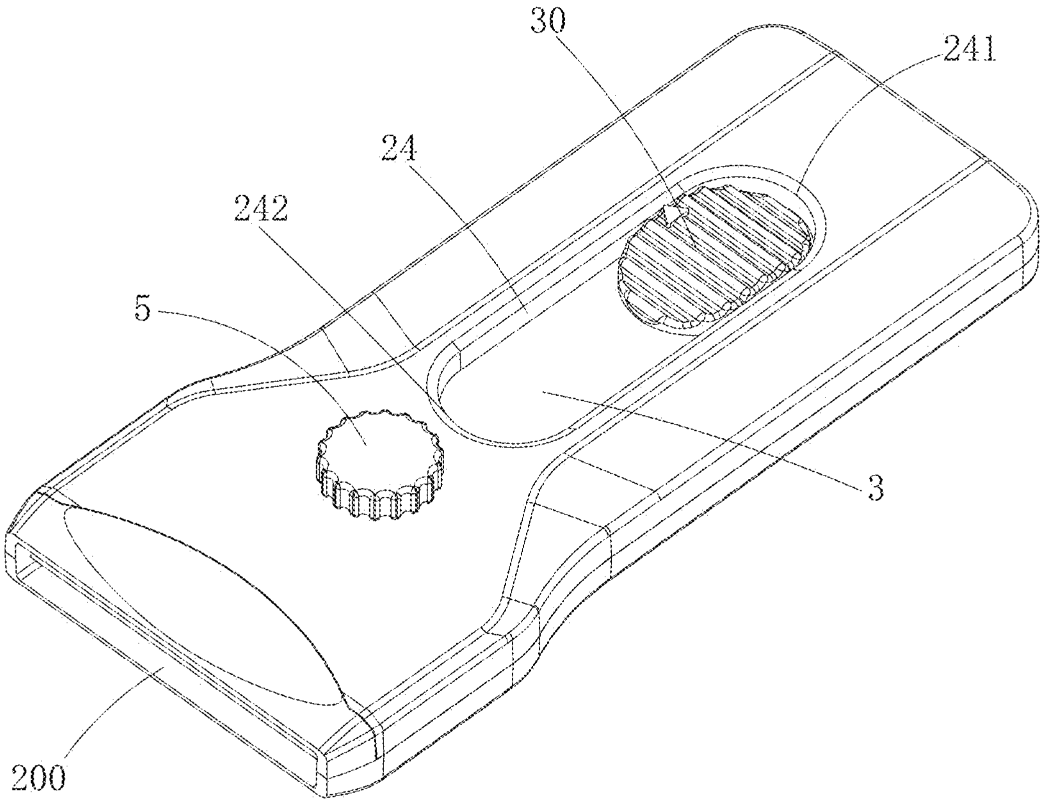
FIG. 35 is a structural schematic view of the entire scraper according to an embodiment VII of the present disclosure, where the blade is in the storage state.
Figure 36:
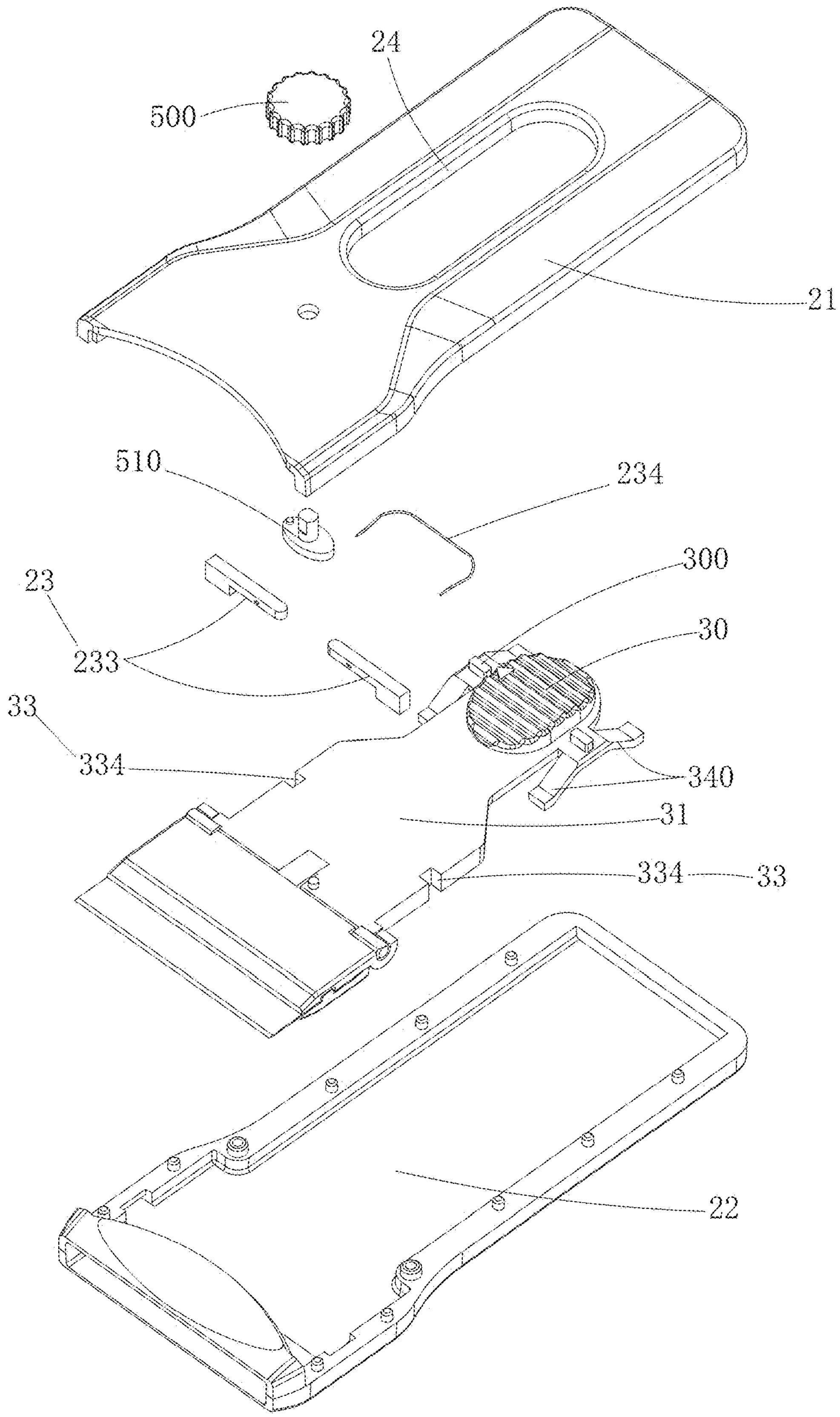
FIG. 36 is an exploded view of the scraper according to the embodiment VII of the present disclosure.
Figure 37:
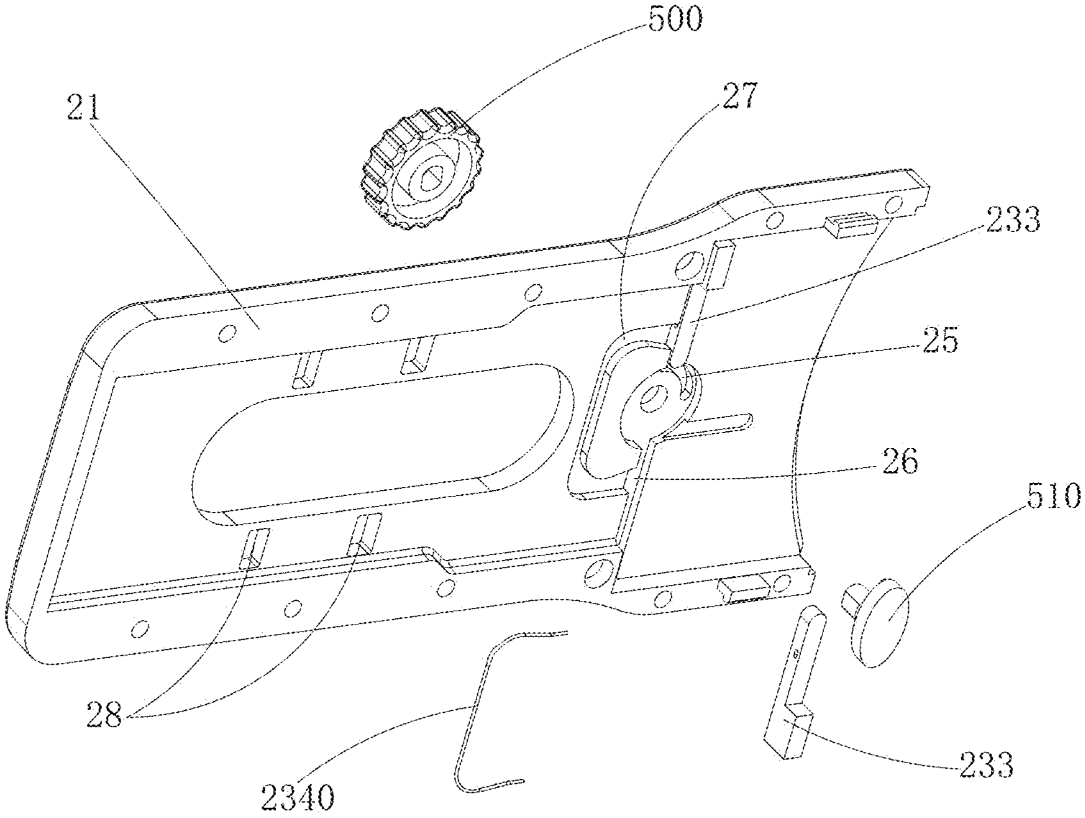
FIG. 37 is an exploded view of the housing and a control member according to the embodiment VII of the present disclosure.
Figure 38:
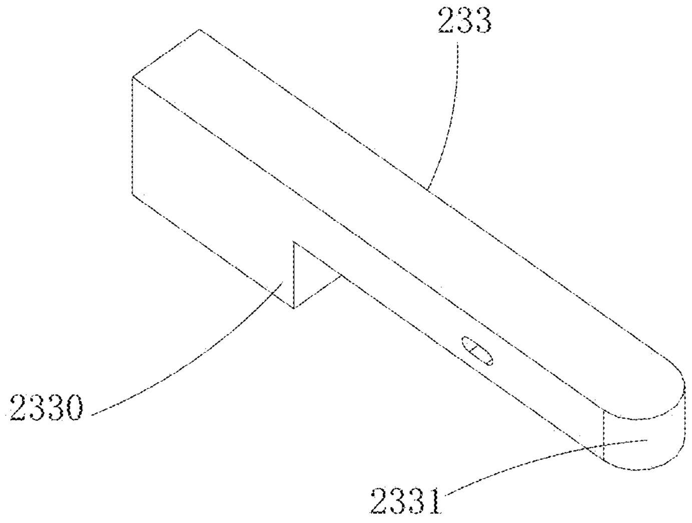
FIG. 38 is a structural schematic view of a limiting rod according to an embodiment VII of the present disclosure.

In order to facilitate the user to manipulate the limiting rod 233 to slide, as shown in FIG. 35-FIG. 37, the scraper further includes a control member 5; the control member 5 is movably mounted on the housing 2. The control member 5 is driveably connected with the limiting rod 233. The user may operate the control member 5 to drive the limiting rod 233 to slide to enable the limiting block 2330 to snap with or disengage out of the second limiting snap slot 334. For example, the control member 5 may be configured as a structure that is slidably connected to the housing 2. A part of the control member 5 is exposed out of the housing 2 to be operated by the user, and another part of the control member 5 enters the storage cavity 20 and is fixedly connected to the limiting rod 233. By arranging the sliding direction of the control member 5 to be consistent with the sliding direction of the limiting rod 233, the user may push the part of the control member 5 that is exposed out of the housing 2 to slide the limiting rod 233, so as to drive the limiting block 2330 to be snapped with or disengaged out of the second limiting snap slot 334.

Figure 39:
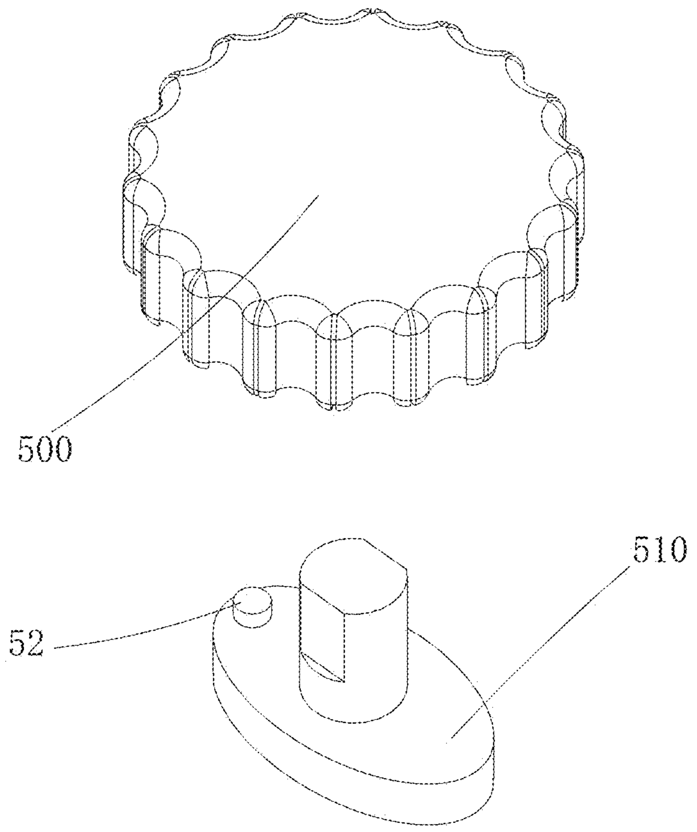
FIG. 39 is an exploded view of the control member according to the embodiment VII of the present disclosure.
Figure 40:
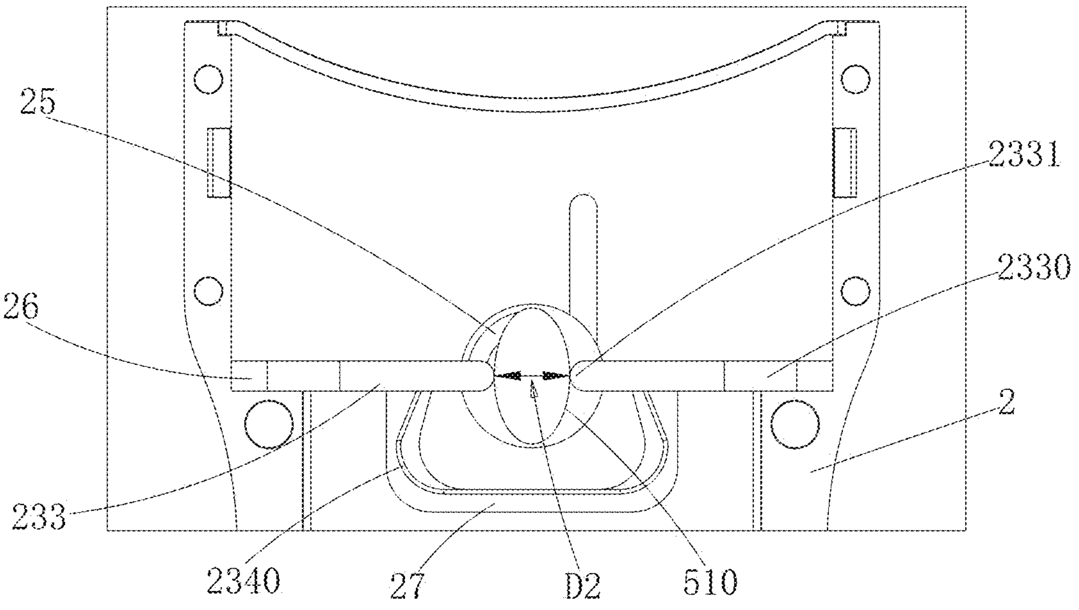
FIG. 40 is a structural schematic view of a transmission block according to the embodiment VII of the present disclosure, where a minimum diameter of the transmission block faces the limiting rod.
Figure 41:
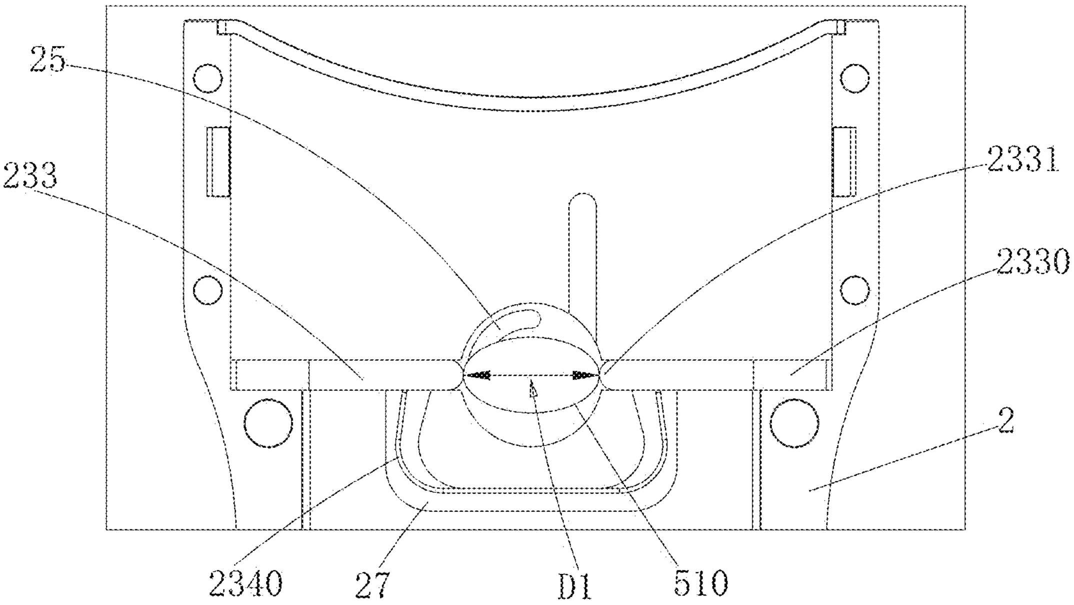
FIG. 41 is a structural schematic view of the transmission block according to the embodiment VII of the present disclosure, where a maximum diameter of the transmission block faces the limiting rod.
Figure 42:
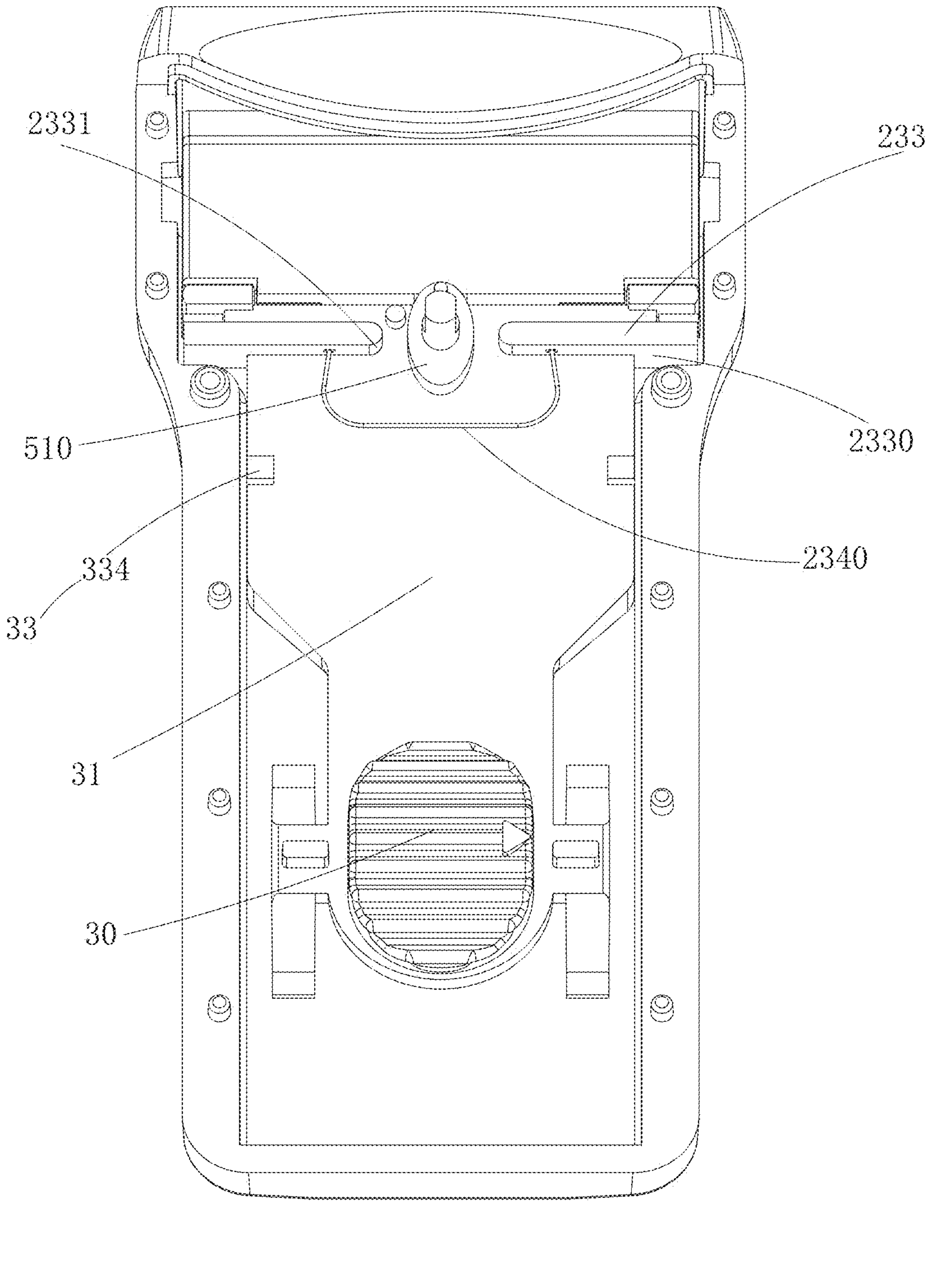
FIG. 42 is a structural schematic view of the transmission block being assembled with the limiting rod, according to the embodiment VII of the present disclosure.

In the present embodiment, two limiting rods 233 are symmetrically arranged. Each of ends of the two limiting rods 233 that are disposed near each other is arranged with a curved contact surface 2331. The control member 5 includes a knob 500 rotatably mounted on the housing 2 and a transmission block 510 coaxially fixed with the knob 500. Two ends of the resilient reset member 234 are connected to the two limiting rods 233 respectively. The resilient reset member 234 drives the two limiting rods 233 to move towards each other and drives the limiting block 2330 to be snapped into the second limiting snap slot 334. As shown in FIGS. 40 and 41, a peripheral wall of the transmission block 510 abuts against both curved contact surfaces 2331 of the two limiting rods 233. The transmission block 510 has a maximum diameter D1 and a minimum diameter D2. The knob 500 can be rotated to enable two ends of the transmission block 510 with the maximum diameter D1 or with the minimum diameter D2 to face towards the limiting rods 233. Specifically, the transmission block 510 may be configured as an elliptical block as shown in FIG. 39, and that is, a regularly-shaped elliptical outer wall may drive the two limiting rods 233 at the same time to ensure that the two limiting rods 233 have a same sliding stroke.

As shown in FIG. 41, when the two ends of the transmission block 510 having the maximum diameter D1 face towards the two limiting rods 233, the limiting rods 233 overcome the resilient force of the resilient reset member 234, such that the limiting block 2330 is disengaged from the second limiting snap slot 334, and the connection member 3 can slide in the storage cavity 20.

As shown in FIG. 40, when the two ends of the transmission block 510 having the minimum diameter D2 face towards the two limiting rods 233, the two limiting rods 233 move towards each other under the resilient force of the resilient reset member 234, such that the limiting block 2330 may be snapped into the second limiting snap slot 334, and the connection member 3 is limited from sliding inside the storage cavity 20.

The symmetrically-arranged two limiting rods 233 improve connection stability between the limiting rods 233 and the connection member 3. The transmission block 510 drives the two limiting rods 233 to slide at the same time. A center of the transmission block 510 is the same as a center of symmetry of the two limiting rods 233. In this way, regardless of where the transmission block 510 rotates to reach, the center of the transmission block 510 has the same distance away from the two curved contact surfaces 2331, such that simultaneous driving of the two limiting rods 233 can be achieved by one transmission block 510. To be noted that a difference between the maximum diameter D1 and the minimum diameter D2 of the transmission block 510 is greater than the sliding stroke of the limiting block 2330 within the second limiting snap slot 334, ensuring that the limiting block 2330 can be disengaged from the second limiting snap slot 334 when the two ends with the maximum diameter D1 of the transmission block 510 face towards the limiting rods 233. A work flow of the control member 5 is as follows. When the operation button 30 is at the first end portion 241, two ends of the minimum diameter D2 of the transmission block 510 face towards the limiting rods 233. At this moment, the resilient force of the resilient reset member 234 causes the limiting blocks 2330 to move approaching the center of symmetry. When the second limiting snap slot 334 on the connection member 3 slides to reach a position of the limiting block 2330, the limiting block 2330 is subjected to an action of the resilient reset member 234 to directly snap into the second limiting snap slot 334, such that sliding of the connection member 3 is limited. At this moment, the blade 1 is maintained in the operating state. When the operation button 30 needs to be further pushed and the knob 500 needs to be rotated, the transmission block 510 is rotated to enable the two ends of the maximum diameter D1 to face toward the limiting rods 233. In this way, the limiting block 2330 is disengaged from the second limiting snap slot 334, and contact between the smooth curved surface of the circumferential wall of the transmission block 510 and curved contact surface 2331 can effectively reduce friction between components and improve the service life of the limiting rods 233 and the control member 5.

In the present embodiment, the resilient reset member 234 is a symmetrical U-shaped resilient rod 2340. The two limiting rods 233 are connected to two ends of the U-shaped resilient rod 2340 respectively. As shown in FIGS. 37, 40, 41, and 42, the limiting rod 233 defines an assembly hole for fixing the U-shaped resilient rod 2340. A U-shaped groove 27 is defined in the inner side of the housing 2 for receiving the U-shaped resilient rod 2340. The U-shaped groove 27 is communicated to the slide groove 26. Furthermore, a depth of the U-shaped resilient rod 2340 is greater than half of the maximum diameter D1 of the transmission block 510, preventing the U-shaped resilient rod 2340 from interfering with rotation of the transmission block 510. The U-shaped resilient rod 2340 may be a symmetrical structure and is resilient to enable the two limiting rods 233 to move close to each other. The U-shaped resilient rod 2340 is disposed at the curved contact surfaces 2331 of the two limiting rods 233. In this way, a space that is transversely occupied by the limiting rods 233 and the U-shaped resilient rod 2340 in the storage cavity 20 may be reduced, the width of the housing 2 is prevented from being excessively large, such that the scraper can be hold by the user easily.

In the present embodiment, in order to improve connection stability between the control member 5 and the first limiting portion 23 and to avoid the transmission block 510 from rotating randomly, the control member 5 further includes a guiding protrusion 52. As shown in FIG. 39, the guiding protrusion 52 is fixedly arranged on the transmission block 510, and the guiding protrusion 52 extends along an axial direction of the transmission block 510. The inner side of the housing 2 defines a curved guiding groove 25 that is mated with the guiding protrusion 52. As shown in FIG. 41, when the guide protrusion 52 is disposed at an end of the curved guide groove 25, the two ends of the transmission block 510 at the maximum diameter D1 face toward the limiting rods 233. As shown in FIG. 40, when the guide protrusion 52 is disposed at the other end of the curved guide groove 25, the two ends of the transmission block 510 at the minimum diameter D2 face toward the limiting rods 233. That is, the curved guide groove 25 has a central of 90 degrees so that the transmission block 510 can only be rotated by 90 degrees. In this way, accuracy of rotation of the knob 500 operated by the user can be improved, ensuring that, in each rotation, the limiting block 2330 can be accurately controlled to disengage from or snapped with the second limiting snap slot 334.

Obviously, the above-described embodiments show only a part of, not all of, the embodiments of the present disclosure. The accompanying drawings provide preferred embodiments of the present disclosure without limiting the scope of the present disclosure. The present disclosure may be achieved in various forms. These embodiments are provided for the purpose of understanding the present disclosure more thoroughly and comprehensively. Although the present disclosure has been described in detail with reference to the foregoing embodiments, any ordinary skilled person in the art may modify the technical solutions recorded in the foregoing specific embodiments or to make equivalent substitutions for some of the technical features therein. Any equivalent structure performed based on the contents of the specification and the accompanying drawings of the present disclosure, applied directly or indirectly in other related technical fields, shall all be equivalently included in the scope of the present disclosure.

What is claimed is:

1. A scraper, comprising:

a blade;

a housing, defining a storage cavity therein, wherein the storage cavity has an opening, and the housing is further arranged with a first limiting portion;

a connection member, slidably mounted in the storage cavity and comprising an external portion in which the blade is mounted and a second limiting portion mated with the first limiting portion;

wherein when the connection member is slid from a first position to a second position, the second limiting portion is mated with the first limiting portion to prevent the connection member from continuing sliding towards the opening, the blade partially protrudes out of the storage cavity through the opening, and the scraper is in an operating state; and when a force perpendicular to a sliding direction of the connection member is applied to at least one of the second limiting portion and the first limiting portion, the second limiting portion is disengaged from the first limiting portion to release the connection member; when the connection member is slid to a third position, the blade is in a replaceable state;

wherein the second limiting portion is resilient; and the second limiting portion, when being subjected to a force, is disengaged from the first limiting portion;

wherein the connection member comprises a body portion, the external portion is formed at an end of the body portion, the second limiting portion comprises a fixation end connected to the body portion and a limiting end; the limiting end is inclined with respect to the body portion and extends towards the opening; when the connection member is slid to the second position, the limiting end abuts against the first limiting portion.

2. The scraper according to claim 1, further comprising an auxiliary button, wherein the auxiliary button is movably connected to the housing; when the connection member is slid to the second position, the auxiliary button is disposed corresponding to the limiting end, the auxiliary button, when being pressed, is configured to push the limiting end to stop abutting against the first limiting portion.

3. The scraper according to claim 2, wherein the second limiting portion comprises an outer surface formed by extending from the fixation end towards the limiting end; the auxiliary button is arranged with an inclined avoidance surface; when the connection member is slid to the second position, the avoidance surface is attached to the outer surface.

4. The scraper according to claim 2, wherein the auxiliary button comprises a movable button that is independently mounted on the housing; and/or the auxiliary button comprises a resilient pressing sheet that is integrally formed with the housing.

5. The scraper according to claim 1, wherein the first limiting portion comprises a limiting wall; the limiting wall is arranged on an inner side of the housing; when the connection member is at the second position, the second limiting portion abuts against the limiting wall to limit the connection member from moving towards the opening.

6. The scraper according to claim 1, wherein the housing defines a guiding hole; the guiding hole extends in the sliding direction of the connection member; the first limiting portion comprises a limiting wall; the limiting wall is arranged on an inner wall of the guiding hole near the opening;

the second limiting portion is at least partially received in the guiding hole; when the connection member is at the second position, the second limiting portion abuts against the limiting wall to limit sliding of the connection member towards the opening.

* * * * *